US011639592B2

(12) United States Patent
Nilsson et al.

(10) Patent No.: US 11,639,592 B2
(45) Date of Patent: May 2, 2023

(54) SPACER STRUCTURE FOR A SAW DISC ASSEMBLY AND A SAW DISC ASSEMBLY

(71) Applicant: HUSQVARNA AB, Huskvarna (SE)

(72) Inventors: Tobias Nilsson, Jönköping (SE); Fredrik Sjödahl, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 110 days.

(21) Appl. No.: 16/081,596

(22) PCT Filed: Mar. 3, 2016

(86) PCT No.: PCT/EP2016/054531
§ 371 (c)(1),
(2) Date: Aug. 31, 2018

(87) PCT Pub. No.: WO2017/148517
PCT Pub. Date: Sep. 8, 2017

(65) Prior Publication Data
US 2019/0093314 A1    Mar. 28, 2019

(51) Int. Cl.
*B27B 5/34*        (2006.01)
*B23D 61/02*    (2006.01)
(Continued)

(52) U.S. Cl.
CPC .............. *E02F 5/08* (2013.01); *B23D 61/026* (2013.01); *B27B 5/34* (2013.01); *E02F 5/14* (2013.01);
(Continued)

(58) Field of Classification Search
CPC ...... B23D 61/02; B23D 61/10; B23D 61/026; B27B 5/30; B27B 5/32; B27B 5/34; E02F 5/08
See application file for complete search history.

(56) References Cited

U.S. PATENT DOCUMENTS 1,711,016 A * 4/1929 Dubois ................. B28D 1/122
125/22
2,735,243 A * 2/1956 Allison ................. B24D 5/123
451/544
(Continued)

FOREIGN PATENT DOCUMENTS

CA    2822262 A1 * 8/2012 .............. E02F 5/145
CN    1785639 A    6/2006
(Continued)

OTHER PUBLICATIONS

English translation of EP0523260. (Year: 1993).*
(Continued)

*Primary Examiner* — Kenneth E Peterson
(74) *Attorney, Agent, or Firm* — Burr & Forman LLP

(57) ABSTRACT

A spacer structure (204; 205) for a saw disc assembly of a sawing machine (4), comprises a hub device (220) having a central axis and being adapted to be coaxially arranged between a pair of axially peripheral saw discs. According to the invention, said hub device (220) is configured and adapted to detachably or non-detachably receive a proximal (Continued)

portion (231) of an elongated spacer means (230) in a substantially radial manner in relation to said hub device, said elongated spacer means (230) being adapted to be arranged between said pair of saw discs, a distal portion (235) of said elongated spacer means (230) being constituted and adapted to detachably or non-detachably connect to said pair of peripheral saw discs.

26 Claims, 18 Drawing Sheets

(51) Int. Cl.
  *E02F 5/08*   (2006.01)
  *E02F 5/14*   (2006.01)
  *F16L 1/032*  (2006.01)
  *H02G 1/06*   (2006.01)
  *E02F 5/10*   (2006.01)
(52) U.S. Cl.
  CPC ............... *F16L 1/032* (2013.01); *H02G 1/06* (2013.01); *E02F 5/10* (2013.01)

(56) References Cited

U.S. PATENT DOCUMENTS

| | | | | |
|---|---|---|---|---|
| 2,807,256 | A | * | 9/1957 | Woolley ............ B23D 59/025 125/13.01 |
| 4,484,560 | A | * | 11/1984 | Tanigawa ............ B28D 1/122 407/41 |
| 5,392,758 | A | | 2/1995 | Rognon |
| 5,884,547 | A | * | 3/1999 | Carlsen ............ B23D 45/00 30/166.3 |
| 2010/0037745 | A1 | * | 2/2010 | Rattunde ............ B23D 61/023 83/838 |

FOREIGN PATENT DOCUMENTS

| | | | | |
|---|---|---|---|---|
| CN | 202114347 | U | | 1/2012 |
| CN | 202640571 | U | | 1/2013 |
| CN | 103143774 | A | | 6/2013 |
| CN | 103157853 | A | | 6/2013 |
| CN | 203674830 | U | * | 6/2014 |
| DE | 20109636 | U1 | * | 3/2002 ......... B23D 61/025 |
| EP | 0 523 260 | A1 | | 1/1993 |
| EP | 0920959 | A2 | * | 9/1999 ............. B24D 5/12 |
| FR | 2905616 | A1 | * | 3/2008 ......... B23D 61/023 |
| GB | 1038290 | A | * | 8/1966 ............ B23D 61/06 |
| JP | 01078764 | A | * | 3/1989 ......... B23D 61/026 |
| JP | 01109078 | A | * | 4/1989 ............. B24D 5/12 |
| JP | 10156727 | A | * | 6/1998 ......... B23D 61/026 |
| JP | H10-156727 | A | | 6/1998 |
| WO | 2012/102659 | A1 | | 8/2012 |
| WO | WO-2012102659 | A1 | * | 8/2012 ........... B23D 45/10 |
| WO | 2013083019 | A1 | | 6/2013 |
| WO | WO-2017139810 | A1 | * | 8/2017 ......... B23D 61/023 |

OTHER PUBLICATIONS

International Search Report and Written Opinion for International Application No. PCT/EP2016/054531 dated Oct. 2016.
International Preliminary Report on Patentability for International Application No. PCT/EP2016/054531 dated Sep. 13, 2018.

* cited by examiner

SPACER STRUCTURE FOR A SAW DISC ASSEMBLY AND A SAW DISC ASSEMBLY

BACKGROUND

The present invention relates to a spacer structure for a saw disc assembly of a sawing machine, comprising a hub device having a central axis and being adapted to be coaxially arranged between a pair of saw discs. It also relates to a spacer structure for a saw disc assembly of a sawing machine, comprising at least one elongated spacer means adapted to be arranged between a pair of axially peripheral saw discs in a substantially radial manner in relation to a central portion of said pair of peripheral saw discs. It furthermore relates to a spacer structure for a saw disc assembly of a sawing machine, comprising a hub device having a central axis and being adapted to be coaxially arranged between a pair of axially peripheral saw discs.

It also relates to a saw disc assembly comprising a pair of axially peripheral saw discs having a common rotational axis and a central portion coaxial to said rotational axis, and furthermore provided with such a spacer structure.

It furthermore relates to a sawing machine comprising a saw disc assembly.

Such spacer structure, such a saw disc assembly and such a sawing machine is known from WO 2012/102659, respectively. When manufacturing such a spacer structure, the material waste will be large due to the fact that the elongated spacer means and the hub device are cut out in one single piece.

OBJECT OF THE INVENTION

An object of the invention is to improve the design of the spacer structure, in order to simplify its manufacture.

SUMMARY OF THE INVENTION

This object has been solved by a spacer structure of the initially defined kind, wherein said hub device is configured and adapted to be detachably or non-detachably arranged at a proximal portion of an elongated spacer means.

The object has also been solved by a spacer structure of the initially defined kind, wherein a proximal portion of said elongated spacer means is constituted and adapted to be detachably or non-detachably arranged at a hub device, a distal portion of said elongated spacer means being configured and adapted to be detachably or non-detachably arranged between said pair of saw discs. The object has furthermore been solved by a spacer structure of the initially defined kind, wherein said hub device is configured and adapted to detachably or non-detachably receive a proximal portion of an elongated spacer means in a substantially radial manner in relation to the central axis of said hub device, said elongated spacer means being adapted to be arranged between said pair of saw discs, a distal portion of said elongated spacer means being constituted and adapted to detachably or non-detachably connect to said pair of peripheral saw discs.

Hereby is achieved a less complicated manufacturing or repair process, since in case a small part of the spacer structure has been damaged, it will not be necessary to remove and exchange only a part of the spacer structure, instead of the whole spacer structure.

Furthermore, during manufacture at least the elongated spacer means can be produced with less material waste, since they can be cut out more or less parallel to one another. Furthermore, cleaning of the cut out parts can be performed more easily.

It has also been solved by a saw disc assembly of the initially defined kind comprising the spacer structure of the invention.

Preferably, the central portion of said pair of peripheral saw discs and the hub device of said spacer structure, respectively, is provided with first fastening means for allowing said hub device to be connected between said pair of peripheral saw discs.

Hereby, heavy lifting of the spacer structure is avoided during its assembly. Furthermore, the spacer structure is glued onto the saw disc, and this operation is made easier by using a set of parts of a hub device and a plurality of elongated spacer means.

Yet furthermore, it has been solved by a sawing machine of the initially defined kind, comprising the saw disc assembly comprising the spacer structure of the invention.

Suitably, said hub device is substantially planar and is provided with first connection means and said elongated spacer means is substantially planar and is provided with second connection means, said first and second connection means being configured and adapted in such a way that they are corresponding connection means, said planar hub device and said planar elongated spacer means wall having substantially the same thickness parallel to said central axis, said hub device having at least one opening for receiving a fastening element for connection of said hub device to said central portion of said pair of peripheral saw discs, a distal portion of said spacer means having at least one bore for receiving a fastening element for connection to said pair of peripheral saw discs.

Preferably, said first connection means comprises a female member, the circumferential wall of said hub device defining an opening into a circumferential portion of said hub device and a retention portion extending from said opening and substantially in the circumferential direction of said hub device, said opening and said retention portion forming said female member. Furthermore, said second connection means comprises a male member, said male member including a protrusion in the proximal portion of said elongated spacer means.

Alternatively, said first connection means comprises a male member, said male member including a protrusion extending substantially radially at the circumference of said hub device. Furthermore, said second connection means comprises a female member, the proximal portion of said elongated spacer means defining an opening into the elongated spacer means, and a retention portion extending from said opening and in a transversal direction of said elongated spacer means, said opening and said retention portion forming said female member.

Hereby is achieved two alternative secure connections of the hub device and each elongated spacer means.

Suitably, the shape and dimensions of said male member correspond to those of the female member, the corresponding dimensions having predetermined dimensions.

Alternatively, said first connection means comprises a first bevelled surface of said hub and a said second connection means comprises a second bevelled surface of said elongated spacer means, said first and second bevelled surfaces being adapted for welding or soldering.

Hereby is achieved a third alternative secure connection of the hub device and the elongated spacer means.

Preferably, said elongated spacer means is made of metal, such as steel or aluminium. It may alternatively be made of a polymer material. Use of aluminium or a polymer material reduces the weight and cost of the product.

Suitably, at least the distal portion of said elongated spacer means is made of a material harder than that of the elongated spacer means. Alternatively, the distal portion of said elongated spacer means is a separate part, said separate part being made of a material harder than that of the elongated spacer means.

Hereby, the spacer means will add to the efficiency cutting operation, and will also not be subjected to wear quicker than that of the working portion of the saw disc.

Preferably, said distal portion is made of a powder metal material. Alternatively, said distal portion is made of a high speed steel having a hardness of at least 60 HRC.

Suitably, said distal portion is provided with a coating containing a nitride, such as TiCN, TiN, TiAlN, TiAlCN or CrN, applied by physical vapour deposition.

Preferably, the first fastening means of the saw disc assembly further comprises a plurality of first through holes in the central portion of said peripheral saw discs, and a plurality of first bores in said hub device, said first through holes of said pair of peripheral saw discs, and said first bores of said hub device being aligned with one another, and furthermore being parallel to said rotational axis when mounted. Suitably, a peripheral portion of said pair of peripheral saw discs and the distal portion of said elongated spacer means of said spacer structure is provided with second fastening means for allowing said elongated spacer means to be connected between said pair of peripheral saw discs.

Hereby is achieved a simplified assembly.

Preferably, said second fastening means comprises at least one second through hole in the radially peripheral portion of said pair of axially peripheral saw discs, and at least one second bore in the distal portion of said elongated spacer means, said second through hole of said pair of peripheral saw discs and said second bore of said spacer means being aligned with one another, and furthermore being parallel to said rotational axis when mounted.

Suitably, said peripheral saw discs are provided with at least one fluid inlet for allowing a fluid, such as air and/or water to enter the space between the peripheral saw discs not being occupied by the spacer structure.

Hereby, efficient cooling of the saw disc is achieved. Furthermore, dirt, i.e. sand, earth, concrete or asphalt between the saw blades is allowed to be flushed away during the cutting operation.

Preferably, an intermediate saw disc is arranged between said pair of peripheral saw discs, said spacer structure being arranged between a first of said peripheral saw discs and said intermediate saw disc, and optionally a second spacer structure being arranged between a second of said peripheral saw discs and said intermediate saw disc.

Alternatively, a pair of intermediate saw disc are arranged between said pair of peripheral saw discs, said spacer structure being arranged between the pair of intermediate saw disc, and optionally a second spacer structure being arranged between a first of said peripheral saw discs and a first of said intermediate saw disc, and optionally a third spacer structure being arranged between a second of said peripheral saw discs and a second of said intermediate saw disc. Preferably, at least one of the peripheral saw discs is an annular saw disc. Both peripheral saw discs may be annular saw discs.

Alternatively, a plurality of intermediate saw disc are arranged between said pair of peripheral saw discs, said spacer structure being arranged between at least two adjacent saw discs, and optionally at least one further spacer structure being arranged between one or more further adjacent saw discs. Preferably, at least one of the peripheral saw discs is an annular saw disc. Both peripheral saw discs may be annular saw discs.

BRIEF DESCRIPTION OF THE DRAWINGS

In the following, the invention will be described while referring to the accompanying drawings, in which.

DETAILED DESCRIPTION OF THE INVENTION

Figure 1A:
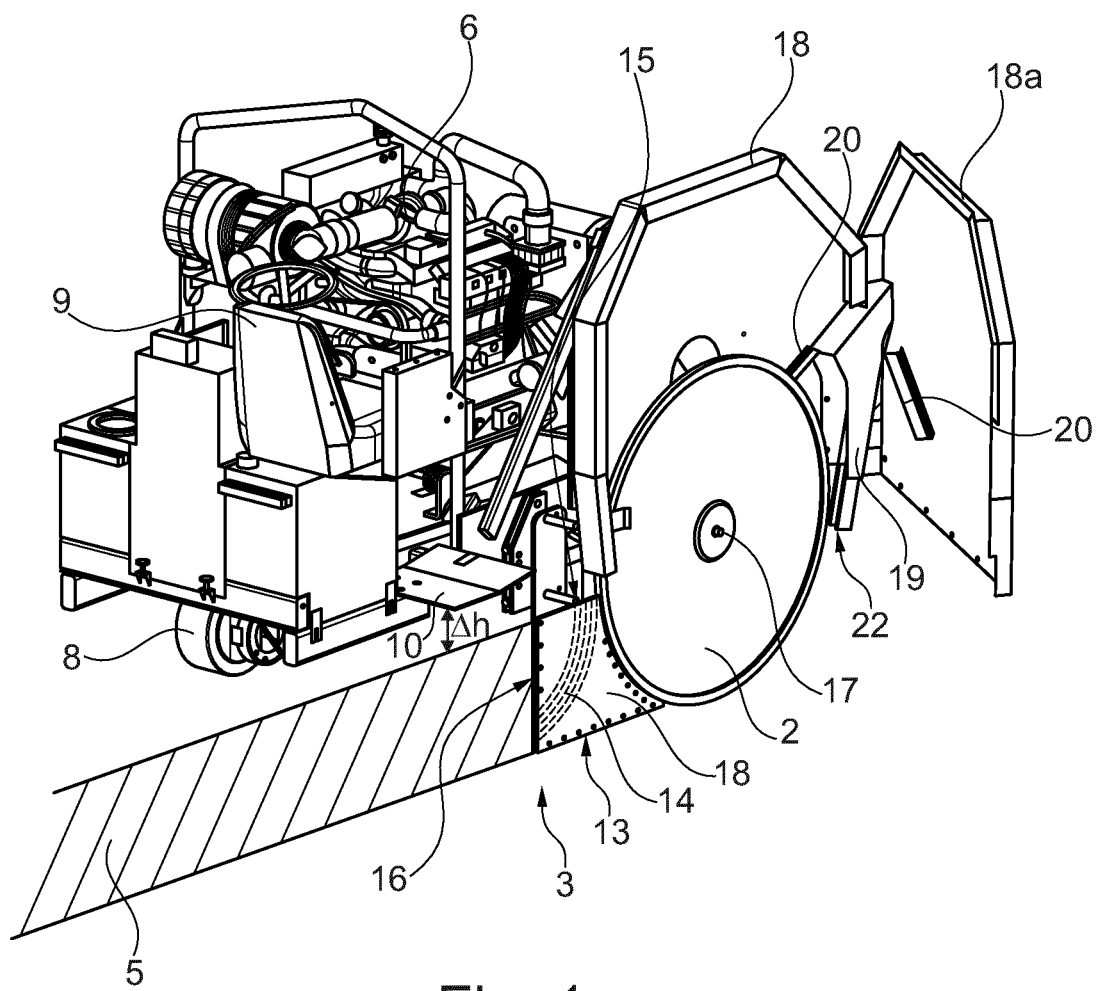
FIG. 1a is a rear perspective view of a laying machine with a sawing machine having a saw disc device.
Figure 1B:
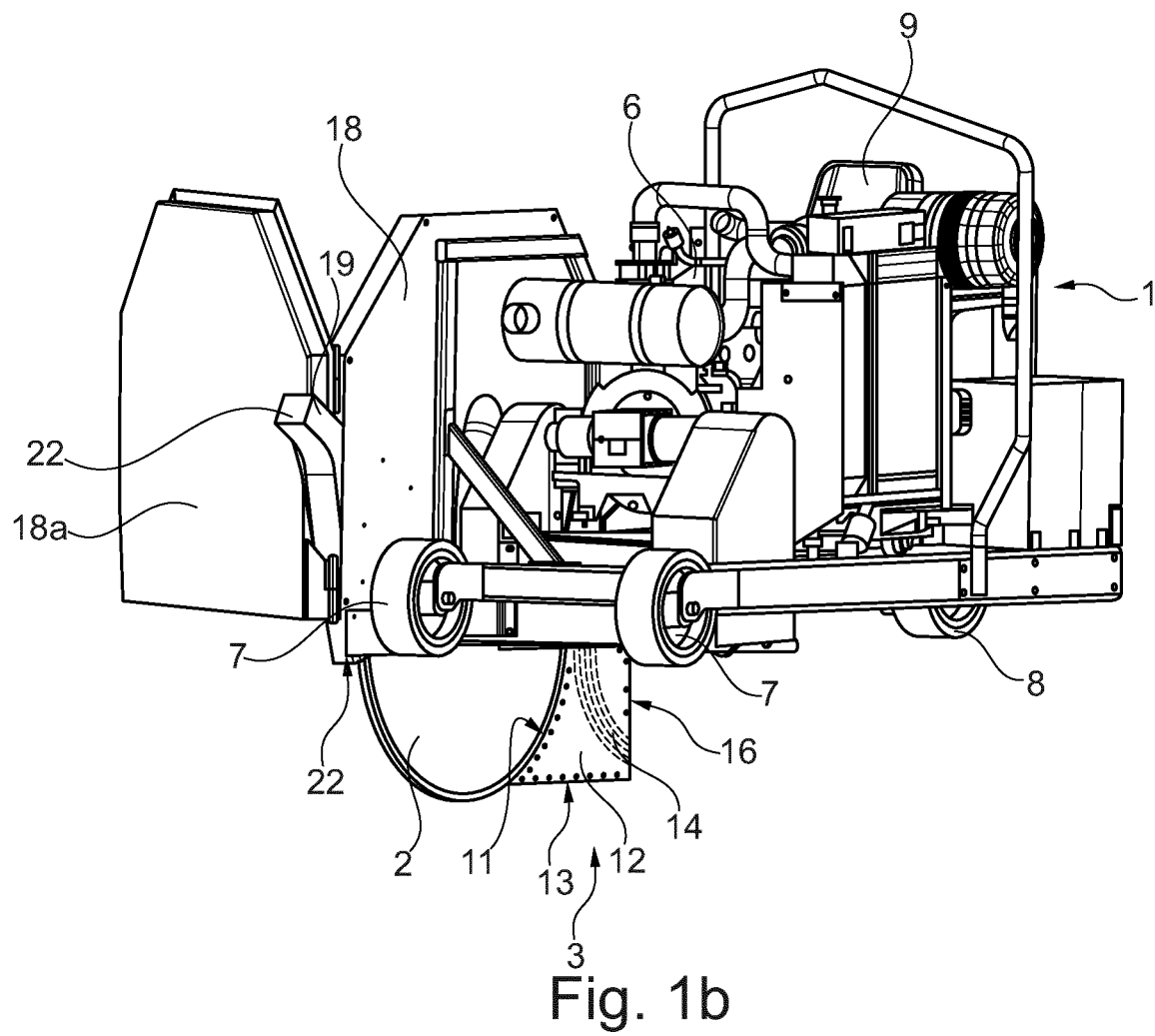
FIG. 1b is a front perspective view of the laying machine shown in FIG. 1.

FIGS. 1a-1b show a laying machine 1 including a sawing machine 4 including a saw disc device 2 for making a trench 5 in the ground and a consolidation and laying means 3 for clearing and safeguarding the trench 5 from collapsing while laying at least one flexible casing or tube, cable or wire into the trench 5. The at least one flexible casing or tube, cable or wire can be rolled off from a not shown reel mounted on the machine 1. A disc guard 18 covers the portion of the saw disc device 2 that is above ground level.

The machine 1 shown in FIGS. 1a-1b has two front wheels 7 and a rear wheel 8. A motor 6, preferably a diesel engine, provides power to propel the machine 1. The motor 6 is also responsible for rotating the saw disc device 2, preferably through a belt transmission (not shown).

The saw disc device 2, the disc guard 18, and the consolidation and laying means 3 are mounted at a first side of the machine 1, here shown as the right hand side of the machine 1. This enables the operator to place the trench 5 close to side structures such as walls. The saw disc device 2 and the consolidation and laying means 3 can be moved from the first side of the machine to the opposite second side (i.e. the left hand side). When changing sides, the disc guard 18 is replaced by a corresponding disc guard having a mirrored configuration.

As shown in FIGS. 1a-1b, a seat 9 and feet support 10 are provided in the rear of the machine 1 straight behind the saw disc device 2 so that a seated driver can drive the machine 1 while closely monitoring and controlling the trench making, consolidation and laying operation. In the shown embodiment the seat 9 and the feet support 10 protrudes somewhat more to the right than the saw disc device 2 with the disc guard 18 and the consolidation and laying means 3, which will somewhat limit how close the machine 1 can make a trench 5 along a wall. However, it would of course be possible to have a driver seat 9 which does not protrude farther than the saw disc device 2 with the disc guard 18 and the consolidation and laying means 3. Such an embodiment may however reduce a seated operator's ability to visually monitor the trench making operation. The clearance Δh between the ground and the feet support 10 is suitably around 20-30 cm. This enables the machine 1 to go very close to lower side structures such as a pavement along a road. The laying machine 1 may also be arranged to be arranged to be controlled wireless so that the operator can choose between seated operation and remote controlled operation.

The saw disc device 2 is preferably driven by the same motor 6 that propels the machine 1 (the motor can e.g. be the same as used in the road saw model Husqvarna RS 8500 D or the floor saw model FS 9900 D). However, it would of course be possible to use separate motors for the saw disc device 2 and the propulsion of the machine 1, as well as other motors types than those exemplified.

The motor 6 drives a shaft 17 that connects to the centre of the saw disc device 2. The shaft 17 with the saw disc device 2 can be moved upwards and downwards to adjust the cutting depth of the trench 5. The raising and lowering of the shaft 17 with the saw disc device 2 is preferably powered by the hydraulic system (not shown) that is powered by the motor 6. In its most upward position the saw disc device 2 is above ground level, i.e. it is in a transport position, and in its most downward position the shaft 17 holding the saw disc device 2 is moved to a position close to the ground, e.g. only a few centimetres from ground level. The maximum trench depth can therefore be made almost as deep as the radius of the saw disc device 2. Depending on how the machine 1 is configured, different blade diameters can be used; preferably the blade diameters are between 500-1200 mm. In one embodiment the saw disc device 2 can be lowered or raised to any position between these extremes, i.e. the trench depth can thereby be varied. In another embodiment the machine 1 has one or several fixed operating depths.

The working portion, i.e. the active portion at the periphery of the saw disc device 2, is between 5-50 mm thick, preferably 5-30 mm, more preferably 10-25 mm, most preferably 15-25 mm. Thereby a thin trench can be cut, which requires less work to make than a thicker one. The saw disc device 2 is preferably of a kind used for floor saws and road saws including a saw disc assembly 200 of two or more saw discs 201 (see FIG. 2). The saw disc assembly 200 may comprise a steel plate that preferably has diamond-impregnated segments at the periphery (working portion) of the blade. Steel plates having diamond-impregnated segments at the periphery are for instance sold by Husqvarna AB. Alternatively, the periphery of the saw disc may comprise metal powder or a coating containing a nitride, such as TiCN, TiN, TiAlN, TiAlCN or CrN.

As can be seen in FIGS. 1a-1b, the disc guard 18 includes a hinged lid 18a that can be opened to access the saw disc device 2. When closed the disc guard 18 has a width slightly larger than the width of the saw disc device 2. In the preferred embodiments the saw disc device 2 is arranged to rotate in an upcut direction, i.e. a rotational direction where the lowest portion of the saw disc device 2 moves in the forward driving direction of the machine 1. Therefore, dust and any debris from the trench making, consolidation and laying operation will mainly exit the trench 5 in front of the saw disc device 2. To collect this dust and debris dust duct 19 is provided in the front section of the disc guard 18. The dust duct 19 has an dust inlet 22 arranged close to the ground in front of the saw disc device 2 for receiving dust from the upcut rotation of the saw disc device 2, and a disc guard dust outlet 21 located above the disc guard dust inlet 22. An upper wall of the disc guard dust duct 19 is partly defined by a flexible sealing member 20 sealing towards the saw disc device 2 and preventing dust from entering the upper volume of the disc guard 18. The sealing member 20 could e.g. be two rubber strips or two brushes.

A not shown dust collector can be connected to the disc guard dust outlet 21, to receive dust and debris from the trench making operation. The dust collector may include suction means or other active means for conveying dust to a receiving compartment of the dust collector, for instance a screw conveyor.

The consolidation and laying means 3 shown in FIGS. 1a-1b is manually put into the trench 5 and secured at the operating depth. When making a trench 5, the laying machine 1 first makes au initial trench 5 with the saw disc device 2. In this initial step the consolidation and laying means 3 is detached from the machine 1. When the initial trench 5 has been made the saw disc device 2 is raised, and the consolidation and laying means 3 is inserted into the trench 5, preferably already supporting the at least one flexible casing or tube, wire or cable. Alternatively the at least one flexible casing or tube, wire or cable can be provided to the consolidation and laying means 3 while in the trench 5. Thereafter the consolidation and laying means 3 is secured to the laying machine 1 and the saw disc device 2 is lowered to the operating depth.

Furthermore, when arranged behind saw disc device 2, i.e. during the trench making, consolidation and laying operation, the lowest portion of the consolidation and laying means 3, i.e. its bottom 13, is arranged to be located above the lowest portion of the saw disc device 2, preferably between 10-100 mm above, more preferably 10-60 mm, most preferably 20-50 mm. Preferably the bottom 13 is not levelled but continuously or sequentially increasing the clearance to the bottom of trench 5 when moving from the front of the consolidation and laying means 3 to the rear of it.

The side walls 12 of the consolidation and laying means 3 prevents the trench walls from partly or completely collapsing before the at least one flexible casing or tube, cable or wire is fed into the trench 5. The consolidation and laying means 3 further has one or more feeding ducts 14 that each has a inlet at an upper portion 15 of the consolidation and laying means 3 for receiving the flexible casing, cable or wire and an outlet at a rear end 16 of the consolidation and laying means 3 for feeding the cable or wire to the trench 5. Each feeding duct 14 can be arranged to guide one or more flexible casings or tubes, wires, or cables, preferably one flexible casing or tube. Thus the at least one feeding duct 14 can be one, e.g. feeding a larger flexible casing with room for multiple cables, or several tubes, wires or cables on top of each other. Preferably the feeding duct 14 is at least two, preferably at least four. The consolidation and laying means 3 is preferably made open or openable at the upper portion of and towards the rear end 16 of the consolidation and laying means 3, so that the at least one flexible casing or tube, wire, or cable can be fed by pushing it down into the consolidation and laying means 3, i.e. this could be done while it is already in the trench 5. Another alternative is to push the at least one flexible casing or tube, wire, or cable through the inlet of the feeding duct 14 to the outlet of the feeding duct 14. A further option would be to have one of the side walls 12 of the consolidation and laying means 3 detachable, i.e. detaching it and putting the at least one flexible casing or tube, wire, or cable into the desired feeding duct 14.

The consolidation and laying means 3 may have the same thickness or is no more than 1 mm thinner than the saw disc device 2. The advantage with this embodiment is that both the saw disc device 2 and the consolidation and laying means 3 can be made as thin as possible, i.e. as thin as the size of the flexible casing or tube, cable or wire allows.

Alternatively, the consolidation and laying means 3 is made thinner than the saw disc device 2, preferably at least 1 mm thinner, more preferably at least 2 mm thinner, most preferably at least 5 mm thinner, even more preferred 10 mm thinner. One advantage of having the consolidation and laying means 3 thinner than the saw disc device 2, is that if the trench 5 is not to be cut in a straight line but rather allowing for a curvature, the lesser thickness of the consolidation and laying means 3 reduces the risk for it to get stuck in the trench 5, i.e. the more thinner the consolidation and laying means 3 is in relation to the saw disc device 2, the steeper curves can be done when making the trench 5.

The wire laying machine 1 could further include, a temperature sensor (not shown) for sensing the temperature of the saw disc device 2, a coolant and/or consolidation liquid supply means (not shown) for supplying liquid to the saw disc device 2, and means for regulating the amount of supplied liquid (not shown) to the saw disc device 2 based on inputs from the temperature sensor. The coolant and/or consolidation liquid for either cooling the saw disc device 2, or consolidating the trench 5 by wetting it thereby reducing risk of partly or entirely collapsing trench walls, or a combination of cooling the saw disc device 2 and consolidating the trench 5.

Regarding the rotational direction of the disc, even though it is preferred to have upcut direction, the opposite would also be feasible. Of course then the dust inlet 22 and dust outlet 21 are suitably arranged at the rear end of the saw disc device 2. When laying fibre optic cables it is common to put out hollow tubes or flexible casings where the fibre optic cables are blown out using air pressure through already installed tubes and/or casings, i.e. after that the tubes and/or flexible casings have been put down in trenches and been covered. The laying machine 1 may also include as UPS receiver which saves positional data which can be used in combination with digital maps to document the excavated trenches.

Furthermore the laying machine 1 may also include means for monitoring the cutting depth and to save this information in combination with the positional data. Also information about how many and which kind of flexible casings, tubes, cables or wires that have been laid down in the trenches.

Thereby a full documentation can be provided about where the trenches have been excavated, how deep they are, and what kind and how many cables, wires etc. that has been laid down in the trenches.

Figure 2:
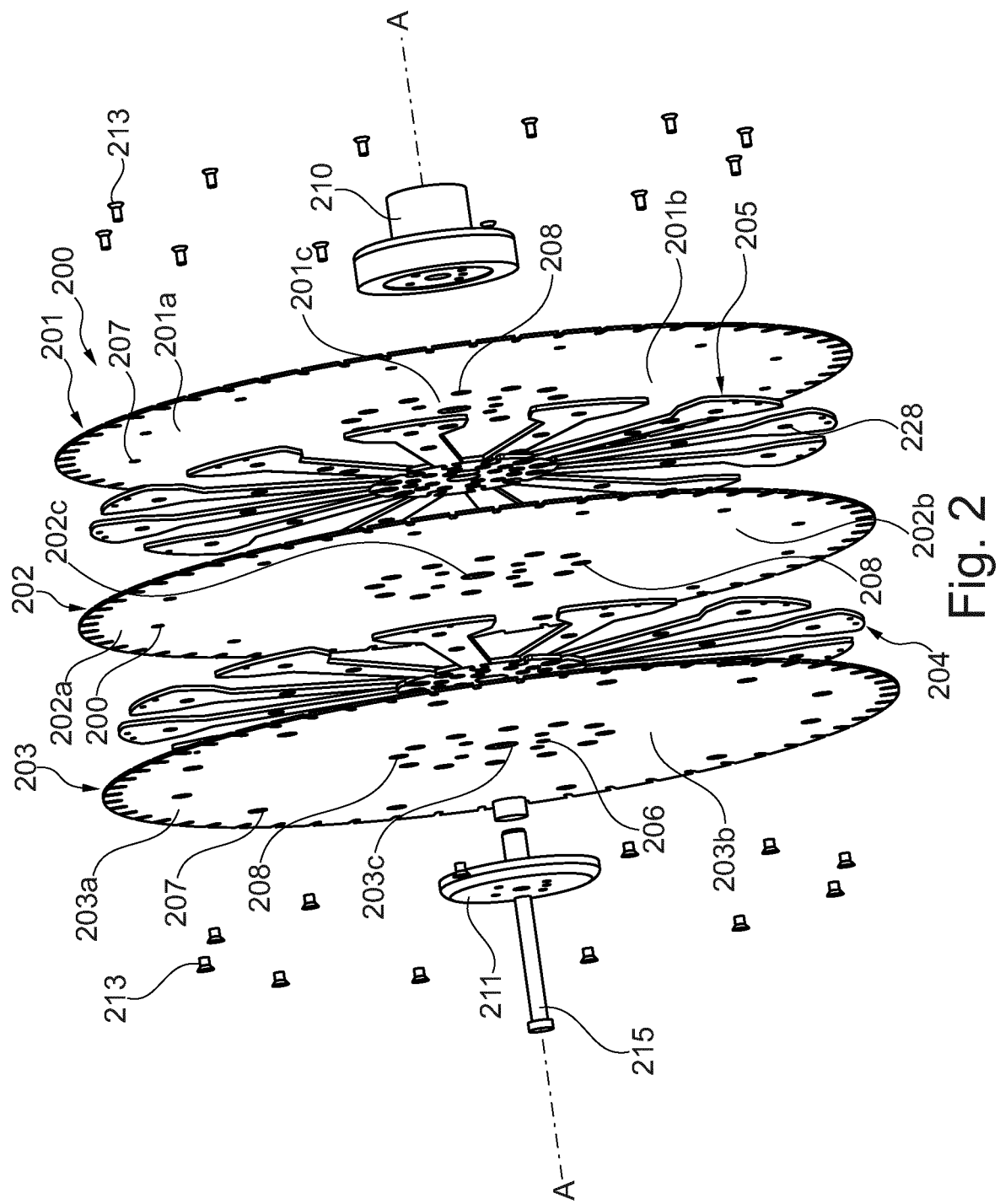
FIG. 2 is an exploded view of the saw disc device shown in FIGS. 1a and 1b, including a saw disc assembly provided with spacer structures.

FIG. 2 shows a saw disc device 2 in the form of a saw disc assembly 200, according to one embodiment, that is suitable for cutting a trench 5 with the laying machine 1. The saw disc assembly 200 includes an inner first saw disc 201 and intermediate second saw disc 202 and an outer third saw disc 203.

Each saw disc 201; 202; 203 has a working portion 201*a*; 202*a*; 203*a* at the periphery of the saw disc and a central portion 201*c*; 202*c*; 203*c* around the centre of the saw disc constituting an axis A-A of the saw disc assembly, and furthermore a saw disc support structure 201*b*; 202*b*; 203*b* extending between the working portion 201*a*; 202*a*; 203*a* and the central portion 201*c*; 202*c*; 203*c*.

The saw discs are preferably made of metal, such as steel or aluminium or alloys thereof, but may be made of a polymer material. Alternatively, they may fully or partly be made of a speed steel having a HRC of more than 60 HRC, or a powder metal. Disregarding the base metal used, the periphery of the discs may have diamond-impregnated segments at the periphery or be provided with a coating containing a nitride, such as TiCN, TiN, TiAlN, TiAlCN or CrN.

The total thickness of the saw disc assembly 200 at is periphery is preferably 15-30 mm, more preferably 15-25 mm. The diameters of the first and third saw discs are preferably in the range 500-1200 mm. The intermediate second saw disc 202 can be of equal diameter or have up to 100 mm smaller diameter. The thickness of the saw discs is preferably in the range of 2-10 mm, more preferably 3-5 mm. The thickness of the segments is preferably in the range of 3-12 mm, more preferably 3.5-6 mm. The thickness of the segments of the intermediate second saw disc 202 may be thinner than those of the outer saw discs, e.g. 0.2-1 mm thinner.

A first spacer structure 204 is arranged between the inner first saw disc 201 and the intermediate second saw disc 202, and a corresponding second spacer structure 205 is arranged between the intermediate second saw disc 202 and the outer third saw disc 203. The spacer structures 204, 205 are of flat, substantially annular shape, including star shapes.

As can be seen in FIG. 2, the saw disc assembly 200 is clamped together at the central portion 201*c*; 202*c*; 203*c* of the saw discs 201, 202, 203 between an inner member 210 and an outer member 211, a plurality of not shown securing bolts extending through first through holes 206 in the saw discs 201, 202, 203 and in corresponding first bores 225 in the spacer structures 204, 205.

Figure 3:
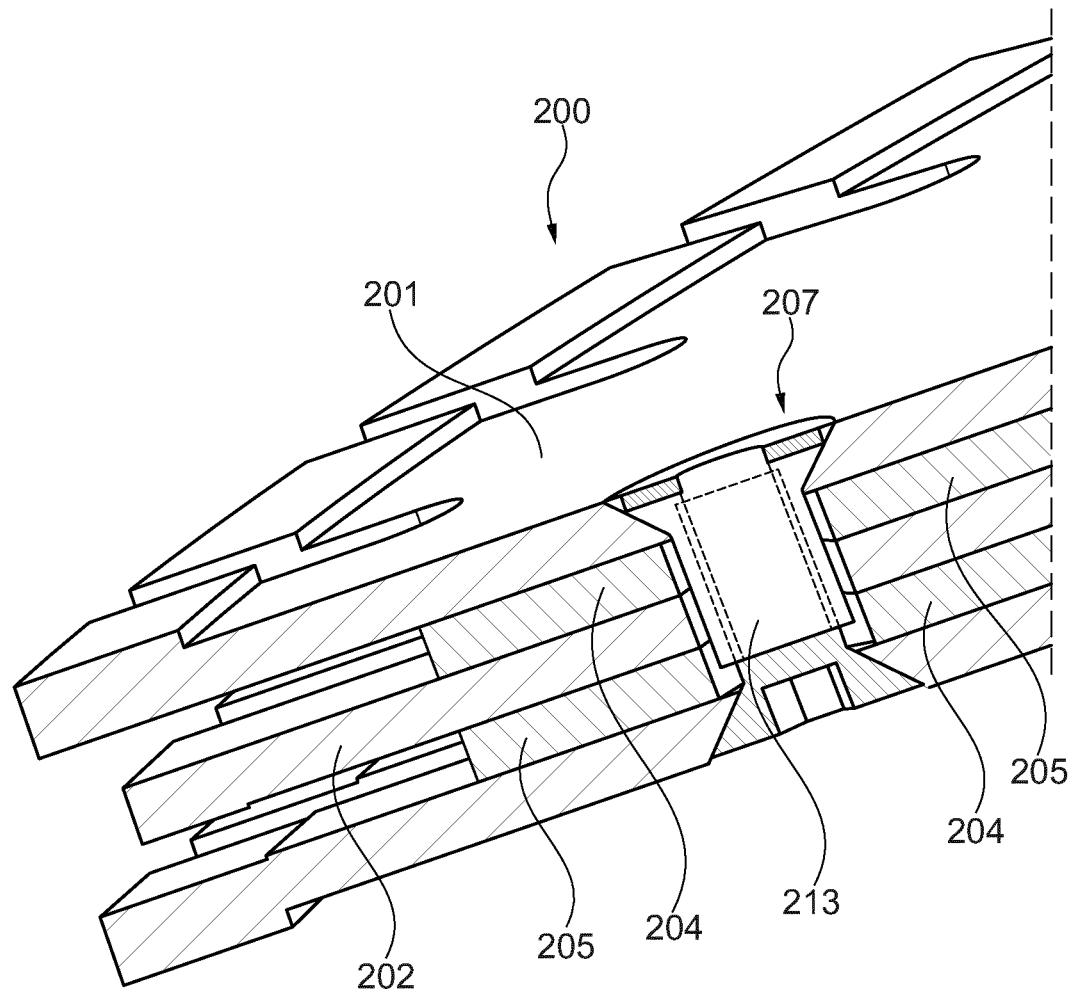
FIG. 3 is a zoomed in part of a cross-section of a peripheral portion of the saw disc assembly shown in FIG. 2.

As can be seen in FIGS. 2 and 3, the saw disc assembly 200 is also secured by a plurality of bolts 213 in second through holes 207 in the periphery of the saw discs 201, 202, 203 and in corresponding second bores 238 in the spacer structures 204, 205. A fluid inlet 208 is provided at a plurality of positions in the saw discs 201, 202, 203 to allow introduction of a fluid. This will be further discussed in connection with FIG. 4*d* below.

Figure 4A:
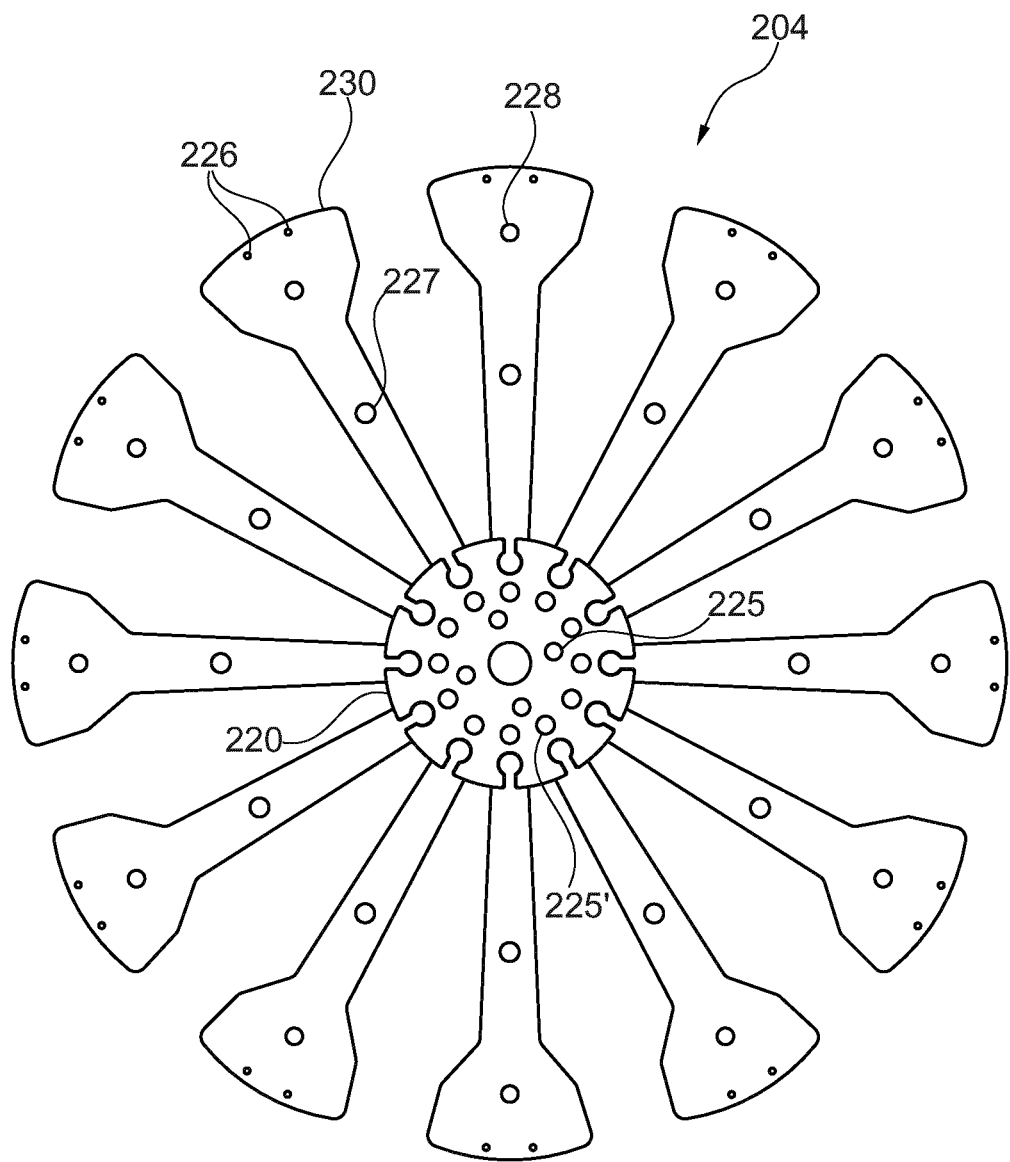
FIGS. 4a-4d are side views of a spacer structure of the kind shown in FIGS. 2 and 3.
Figure 4B:
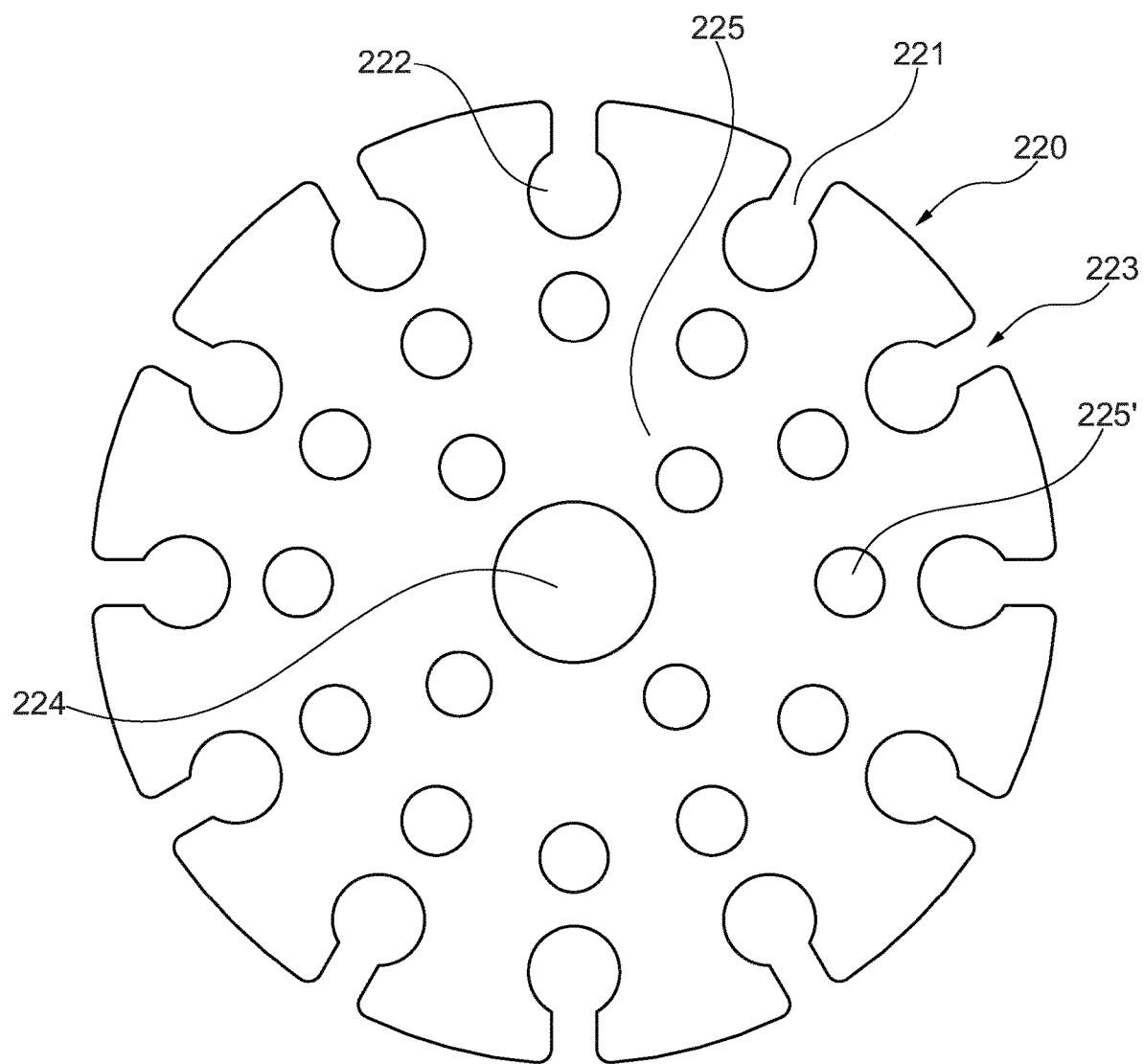
Figure 4C:
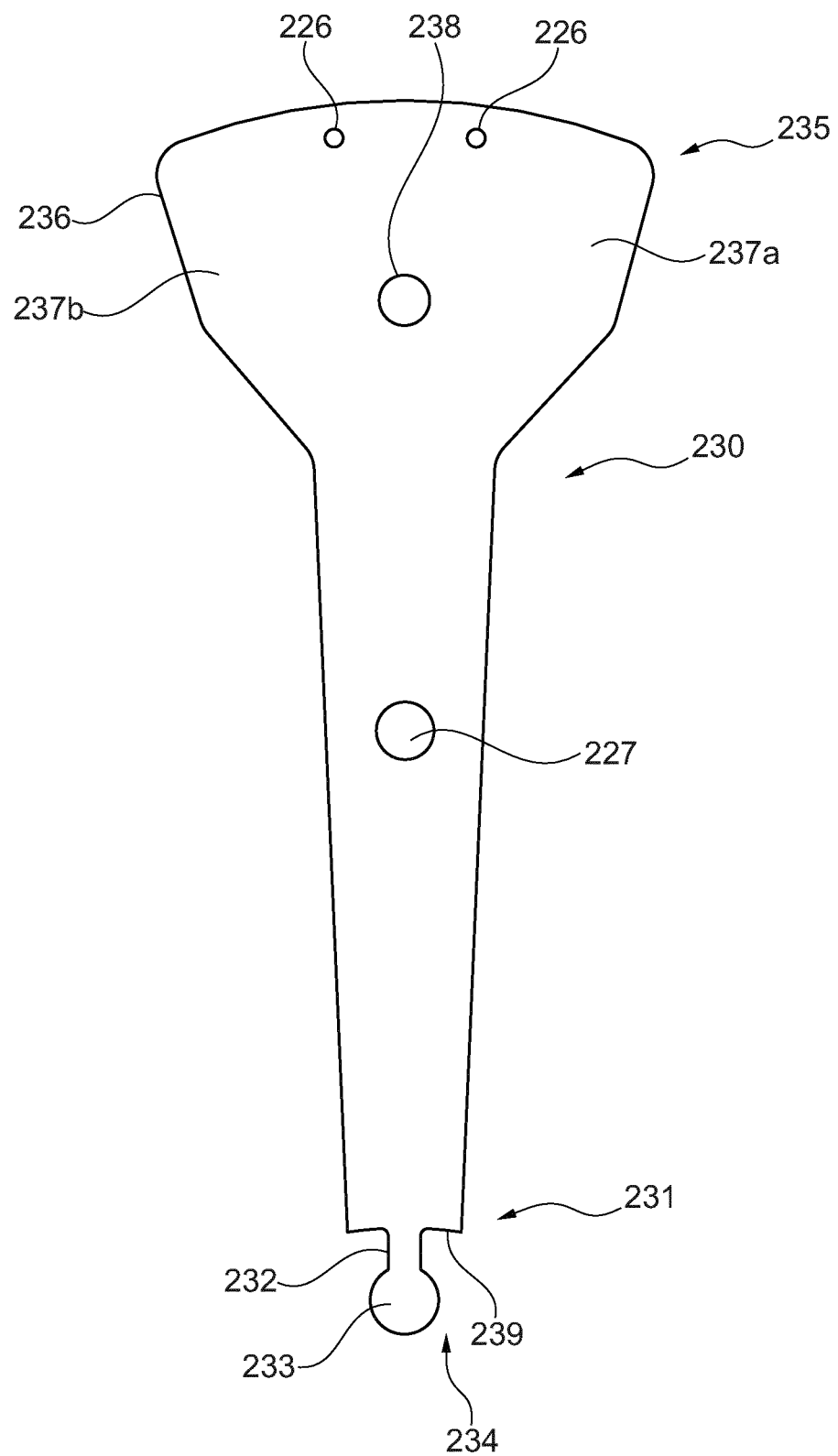

In FIGS. 4*a*-4*c* are shown the first spacer structure 204 provided with a hub device 220 provided with the first bores 225 and twelve elongated spacer means 230 provided with the second bores 238.

The huh device 220 is furthermore provided with alternative first bores 225' for adapting to alternative connection standards of sawing machines.

The elongated spacer means 230 is furthermore provided with a pair of peripheral guide holes 226 and a central guide hole 227.

The hub device 220 has a substantially circular shape and is provided with twelve circumferentially arranged radially extending openings 221, and a retention portion 222 extending from said radially extending opening 221 and substantially in the circumferential direction of said hub device 220, said radially extending opening 221 and said retention portion 222 constituting a female member 223.

In the huh device, a central opening 224 is arranged, adapted to receive said central bolt 215 (see FIG. 2), also constituting a central axis A-A for the saw disc assembly 200.

The elongated spacer means 230 provided at its proximal portion 231 with an axially extending stem 232, and at the end of the axially extending stem a protrusion 233 extending in the transverse direction of said elongated spacer means 230. The width of the axially extending stem 232 and the protrusion 233 are made with slightly smaller dimensions than that of the radially extending openings 221 and the retention portions 222, i.e. the female member 223 of the hub device 220, the axially extending stem 232 and the protrusion 233 together constituting a male member 234.

At the distal portion 235 of the elongated spacer means 230, a radially extending portion 236 is provided, having a clockwise extending portion 237a and in a counter-clockwise extending portion 237b. Substantially centrally in the radially extending portion 236 of the distal portion 235, a second bore 238 is provided for receiving said bolt 213 (see FIG. 3).

It should be noted that at the proximal portion 231 of the elongated spacer means 230 has an end surface 239, and that the axially extending stem 232 extends from the end surface 239. According to this embodiment, the end surface 239 has the shape of an arc of a circle corresponding to and conforming to the substantially circular shape of the hub device 220.

Figure 4D:
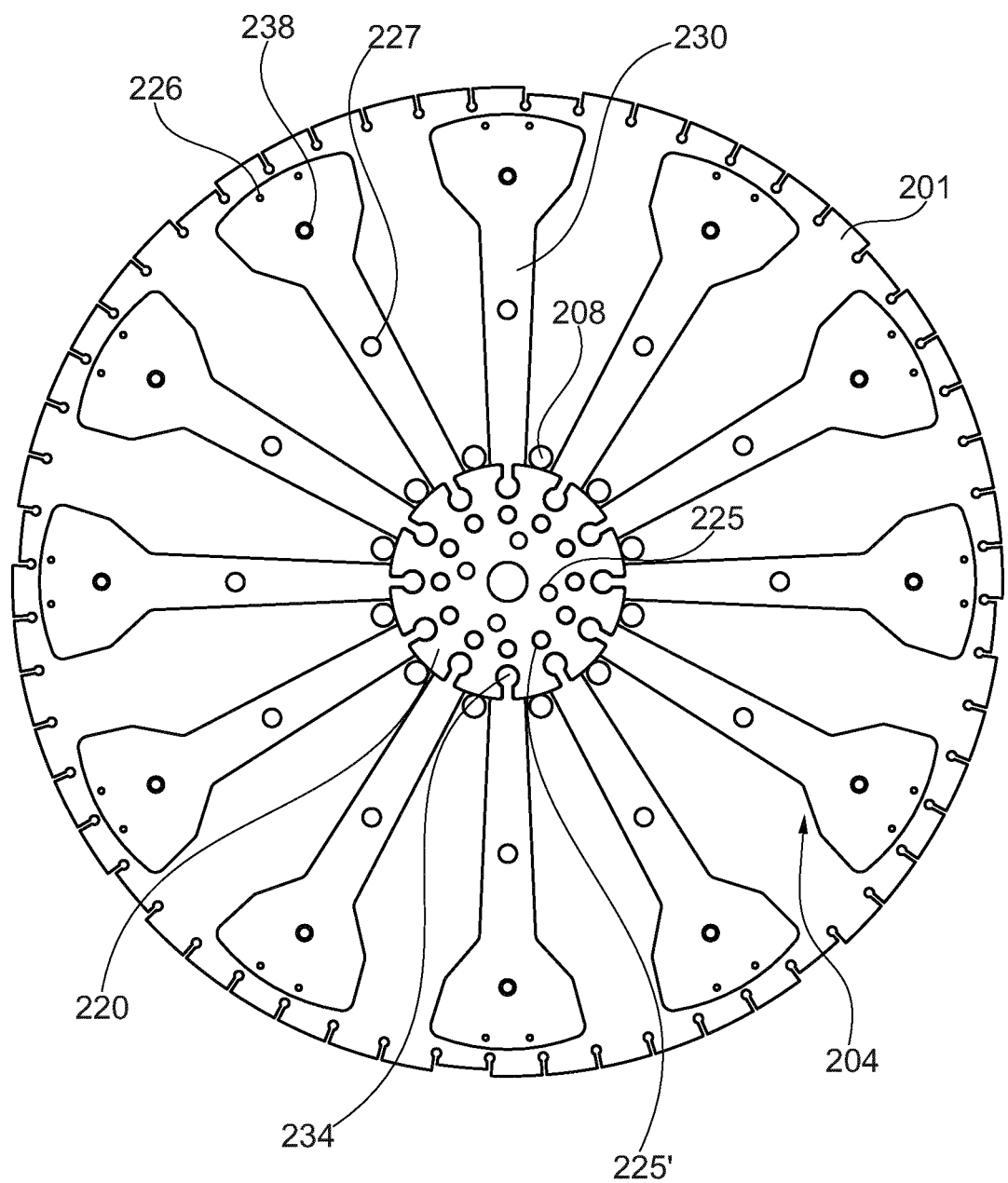

In FIG. 4d is shown the first spacer structure 204 (or the second spacer structure 205), i.e. the hub device 220 and the twelve elongated spacer means 230 mounted onto the inner first saw disc 201. Of course, it could as well be the intermediate second saw disc 202 or the outer third saw disc 203.

When mounting the spacer structure onto the saw disc, the huh device is first glued onto and secured against the saw disc 201 by not shown bolts in the first bores 225 or in the alternative first bores 225'.

The peripheral guide holes 226 and a central guide hole 227 may be utilised when attaching a to facilitate gluing of the elongated spacer means 230 onto the saw disc, i.e. while positioning the male member 234 in the female member 222 and aligning the second bore 238 of the elongated spacer means with the second through hole 207 of the saw disc. They may also be utilised when performing e.g. physical vapour deposition or laser welding or laser sintering to achieve a hard surface at the distal portion 235 of the elongated spacer means 230.

As mentioned above, the saw discs 201, 202, 203 are provided with fluid inlets 208. The fluid may be a gas (such as air) or a liquid (such as water), or a combination, such as a mixture of water and air.

More particular, the fluid inlets 208 are provided in the saw discs 201, 202, 203 at a position radially outside the hub device 220 and in a circumferential direction between the elongated spacer means 230 to allow introduction of a fluid into the spaces between the elongated spacer means 230 inside the saw disc assembly 200. The fluid is introduced inside the disc guard 18 (see FIGS. 1a-1b) by suitable means, such as a gas hose or a liquid hose either on one side of the saw disc assembly 200 or on both sides thereof. Preferably, the hose is provided with a not shown nozzle directed towards and at a distance from the first and/or third saw discs 201, 203. The fluid is thus sprayed towards the first and/or third saw discs 201, 203. The fluid is introduced through the fluid inlets 208 and will enter into the spaces between the saw discs 201, 202, 203 and move substantially radially between the elongated spacer means 230 and towards the periphery of the saw discs 201, 202, 203.

Figure 5:
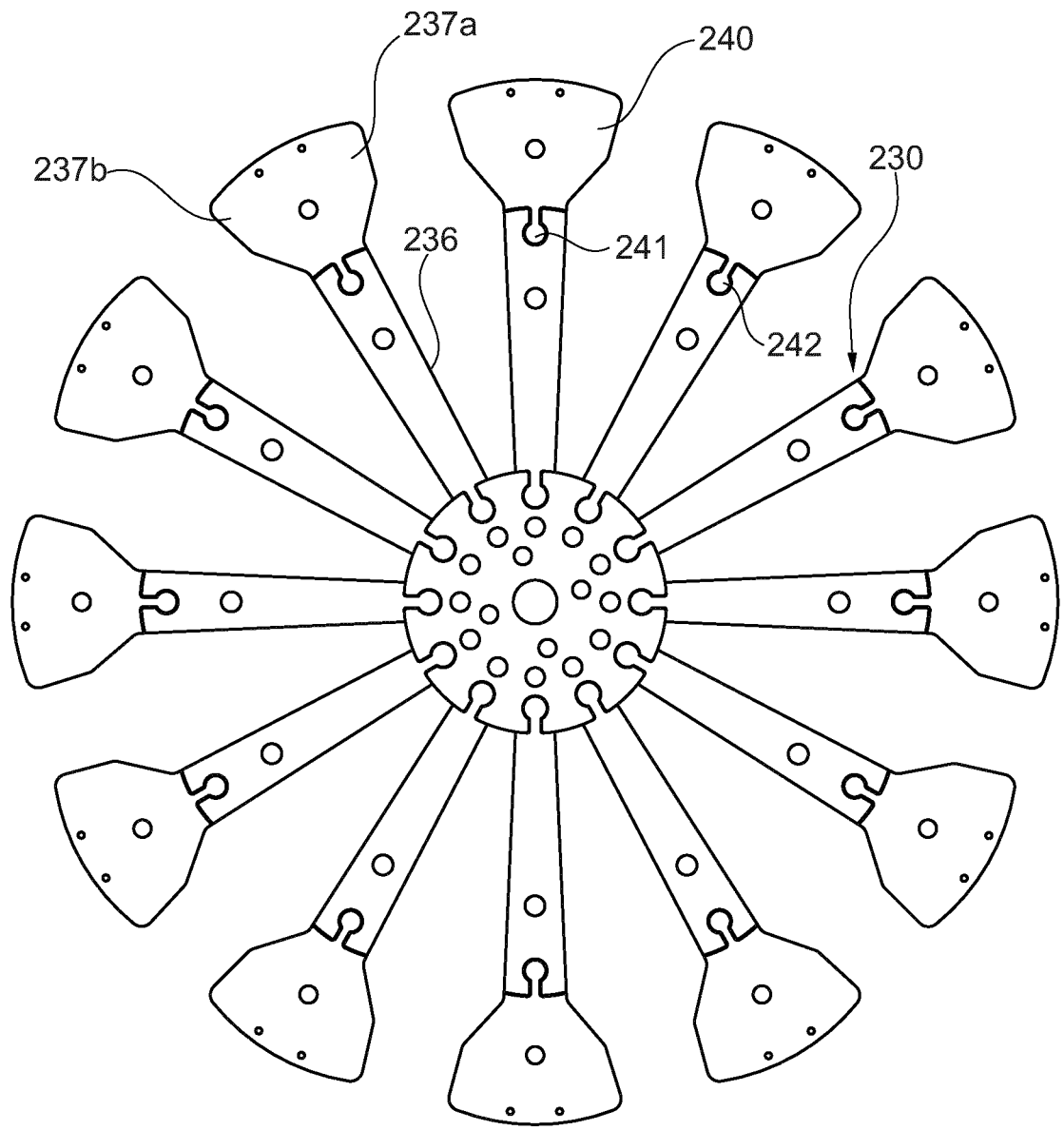
FIG. 5 is a side view of an alternative spacer structure.

FIG. 5 shows an alternative embodiment, according to which the elongated spacer means is divided into a radially extending part closest to the huh device 220, and a peripheral, separate part 240 including the clock-wise and counter-clockwise extending portions 237a, 237b of the distal portion 235. The separate part 240 are attached to the radially extending part 236 via distal female and male members 241, 242, in a manner corresponding to that of the female and male members 223, 234 of the hub device 220 and the proximal end of the elongated spacer means 230. Hereby, it is possible to choose different materials of the radially extending portion 236 and the separate part 240.

Figure 6:
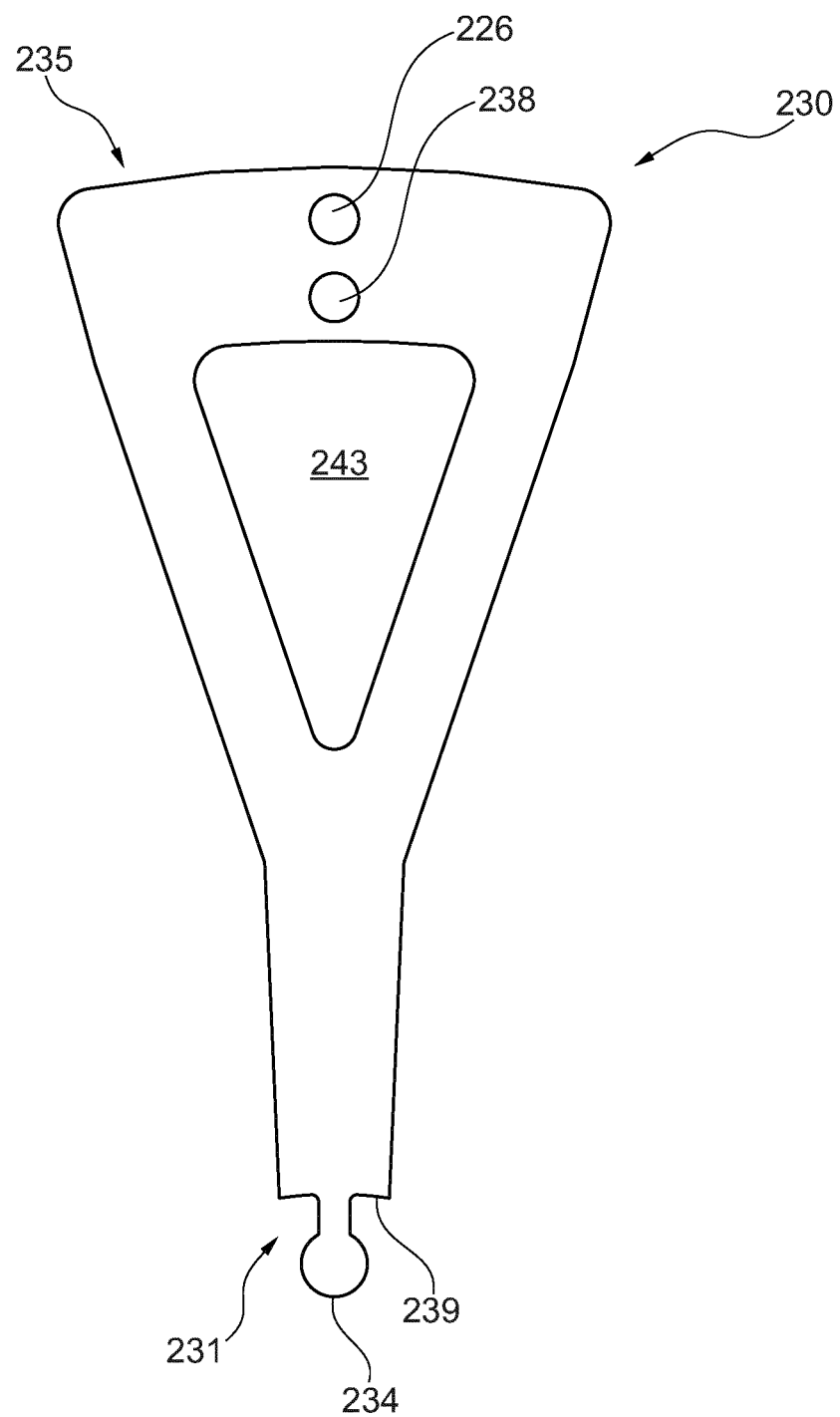
FIG. 6 is a side view of a part of an alternative spacer structure.

FIG. 6 shows an alternative shape of the elongated spacer means 230. Apart from a male member 234 at its proximal portion, the opposite, distal portion 235 has a cut-out 243 extending toward the proximal and for reducing weight of the spacer structure.

Figure 7:
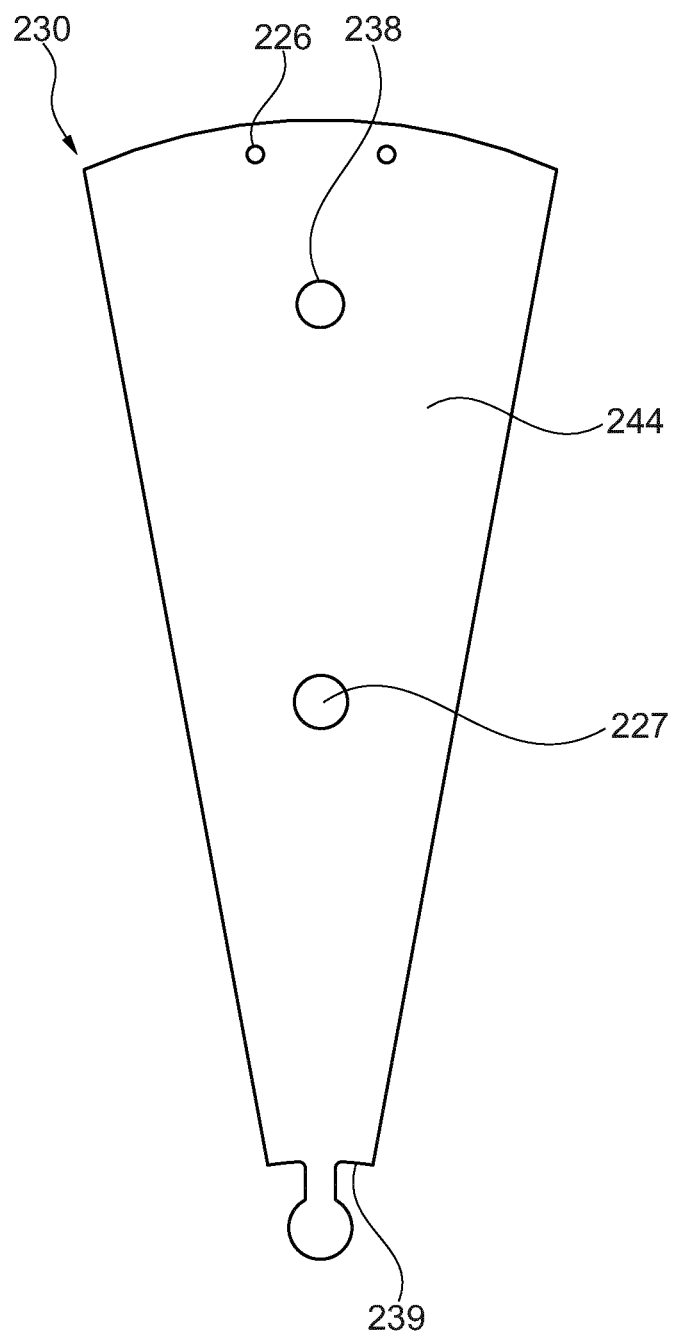
FIG. 7 is a side view of a part of an alternative spacer structure.

FIG. 7 shows the elongated spacer means 230 in the form of a circle sector 244. Such a shape adds to the stability of the spacer structure.

Figure 8:
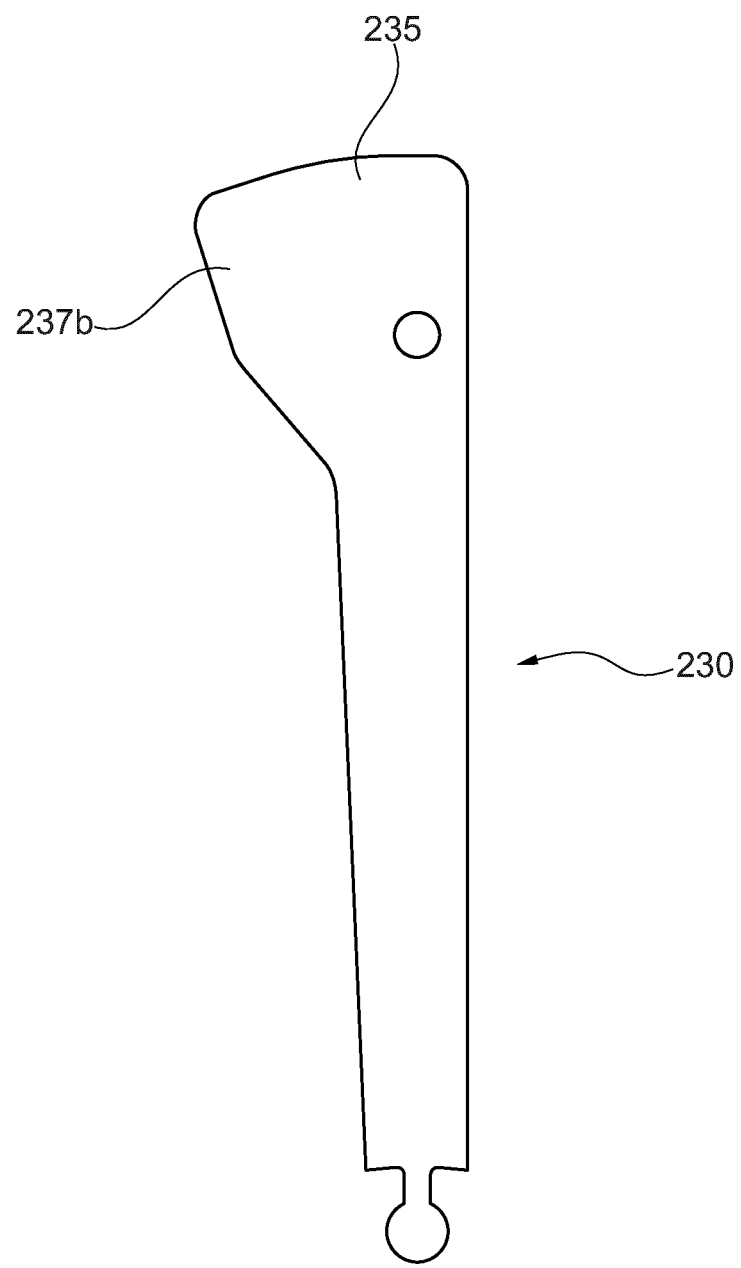
FIG. 8 is a side view of a part of an alternative spacer structure.

FIG. 8 shows the elongated spacer means 230 having at its distal portion a counter-clockwise extending portion 237b. This shape allows for production with less material spillage than what is the case regarding the embodiment shown in FIG. 6.

Figure 9A:
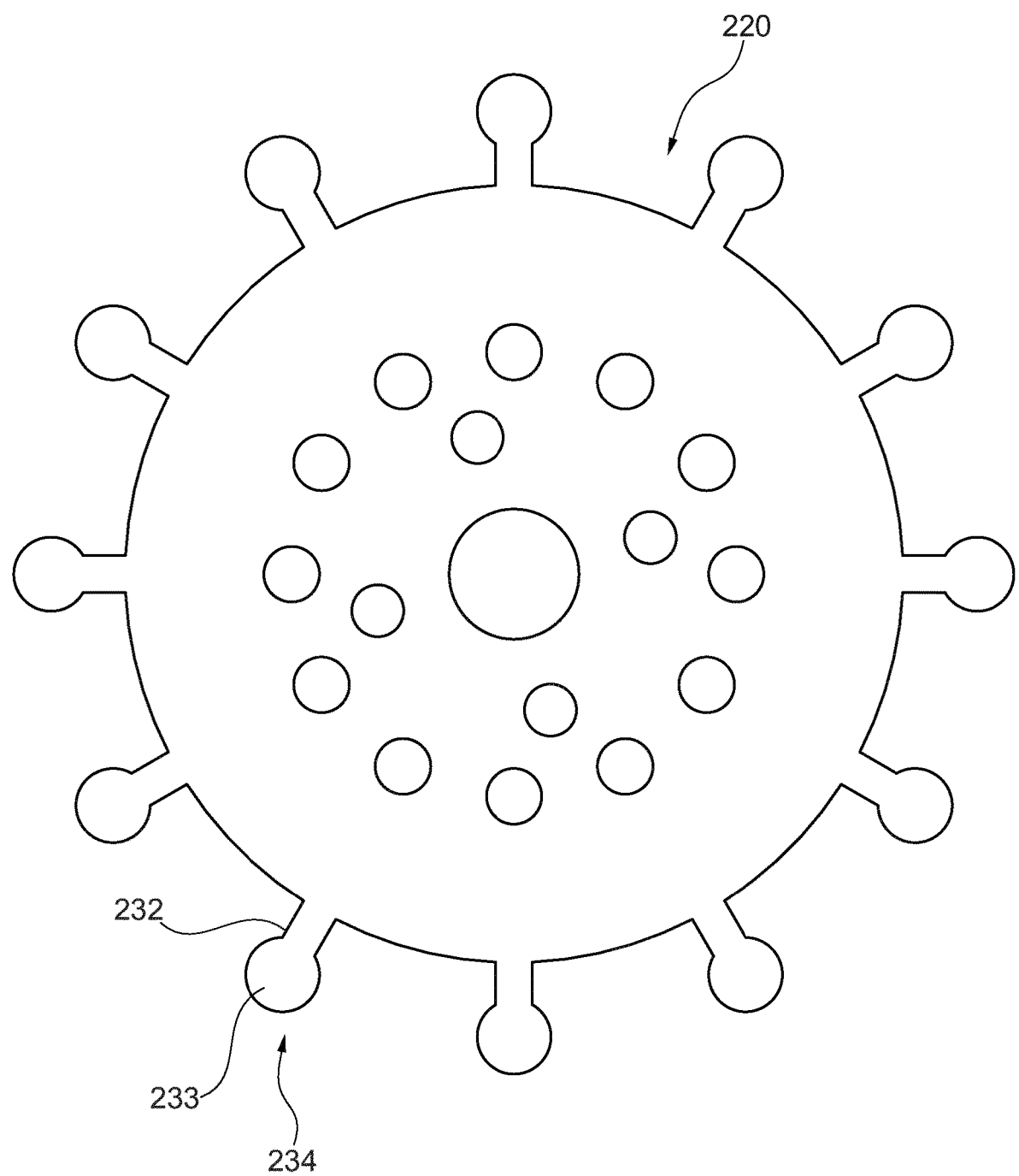
FIGS. 9a-9b are side views of an alternative spacer structure.
Figure 9B:
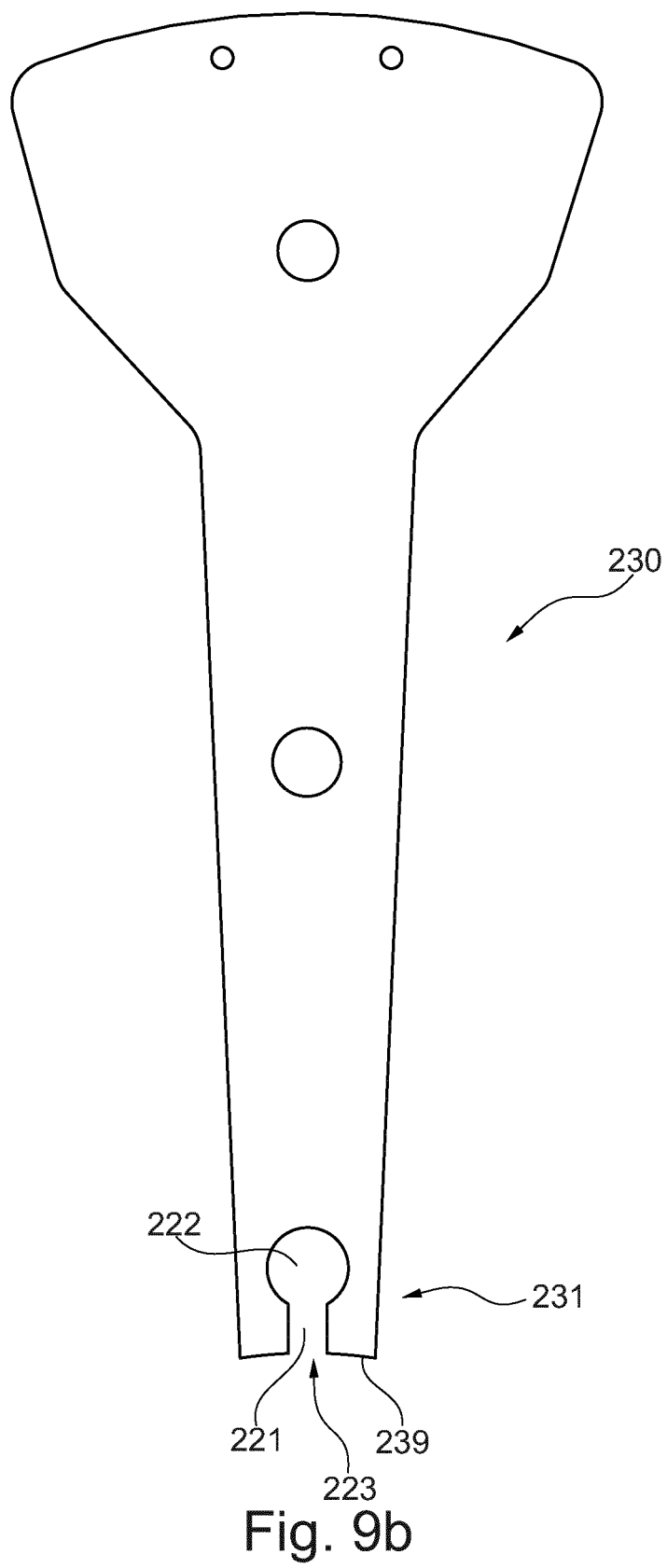

FIGS. 9a-9b show a variant, according to which the hub device 220 includes twelve male members 234 in the radial circumference thereof. The male member 234 has radially extending stem 232 and a protrusion 233 extending in the circumferential direction of the hub device 220.

The proximal portion 231 of said elongated spacer means 230 defines an opening 221 from the end surface 239 and into the elongated spacer means, and a retention portion 222 extending from said opening 221 and in a transversal direction of said elongated spacer means 230.

Thus, according to this variant, the hub device 220 is provided with a male member 234 about its substantially circumference, while the elongated spacer means 230 is at its proximal portion 231 provided with a corresponding female member 223.

Also in this case, the proximal portion 231 of the elongated spacer means 230 has the shape of an arc of a circle (at 239) corresponding and conforming to the substantially circular shape of the huh device 220.

Of course, also in this case, the clock-wise and counter-clockwise extending portions 237a, 237b of the distal portion 235 of the elongated spacer means 230 may be provided on a separate part 240, as shown in FIG. 5. And of course, the female opening may instead be arranged on the separate part 240 and the male part on the radially extending portion 236.

Figure 10A:
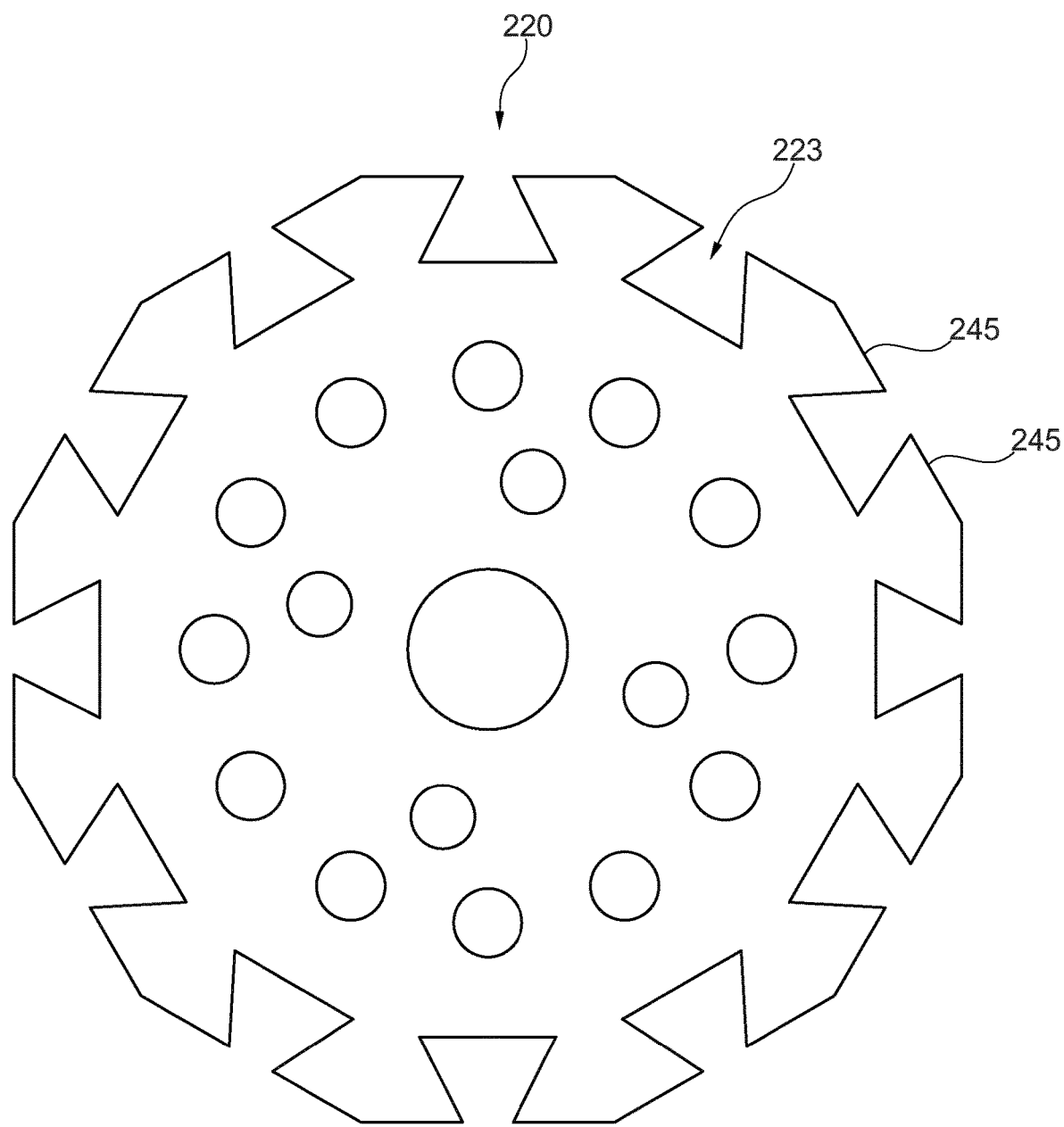
FIGS. 10a-10b are side views of an alternative spacer structure.
Figure 10B:
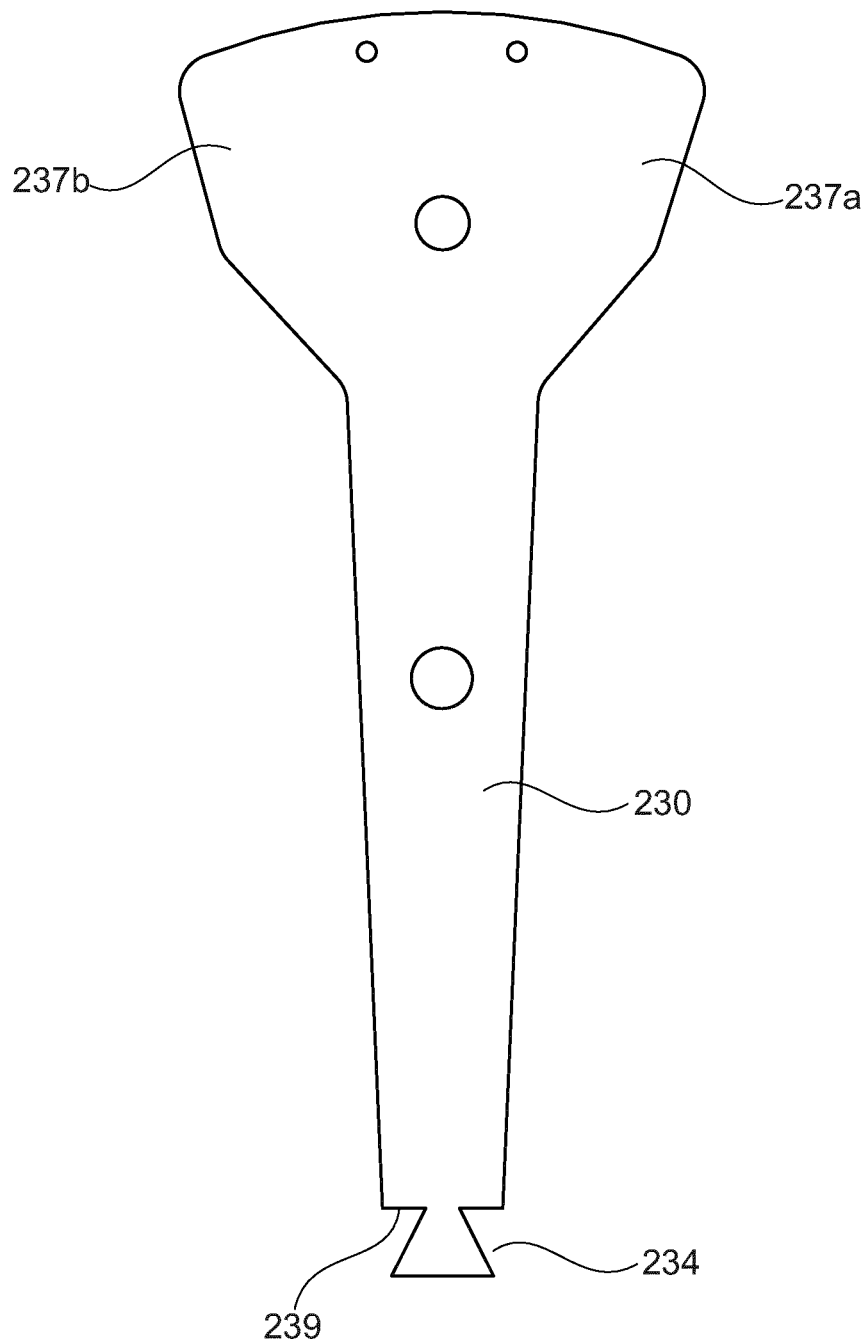

FIGS. 10a-10b illustrates an alternative embodiment, according to which the female member 223 of the hub device has a dovetail shape and the male member 234 has a corresponding dovetail shape.

Furthermore, the hub-device is a dodecagon (a 12-sided regular polygon) for receiving twelve elongated spacer means 230, the proximal and of which having a substantially flat end surface 239 corresponding and conforming to the flat surfaces 245 of the dodecagonal hub device 220.

Of course, also in this case, the clock-wise and counter-clockwise extending portions 237a, 237b of the distal portion 235 of the elongated spacer means 230 may be provided on a separate part 240, as shown in FIG. 5. And of course, the female opening may instead be arranged on the separate part 240 and the male part on the radially extending portion 236.

Of course, the female member 223 may instead be arranged on the elongated spacer member 230 and the male member 234 on the huh device 220, in a manner corresponding to that of FIGS. 9a-9b, however with flat end surface 239 of the elongated spacer means 230 and flat surfaces 245 of the hub device 220.

Figure 11:
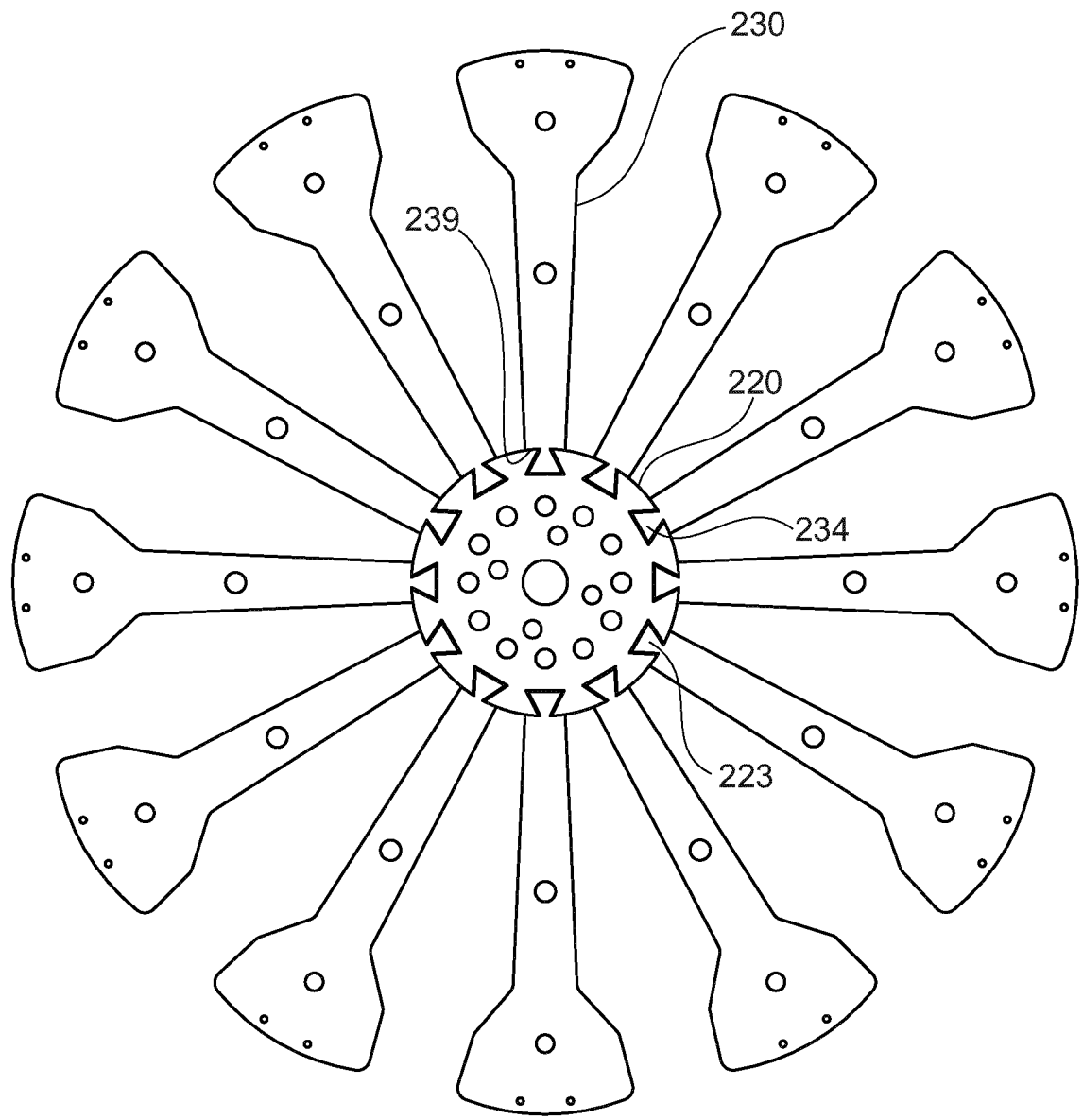
FIG. 11 is a side view of an alternative spacer structure.

As can be seen in FIG. 11, a substantially circular shaped hub device 220 may be provided with elongated spacer means 230 being interconnected by male and female members 223, 234 having a dovetail shape, arranged on the elongated member and the hub device, or vice versa Consequently, the proximal portion 231 of the elongated spacer means 230, i.e. the end surface 239 has the shape of an arc of a circle corresponding to and conforming to the substantially circular shape of the hub device 220

Figure 12:
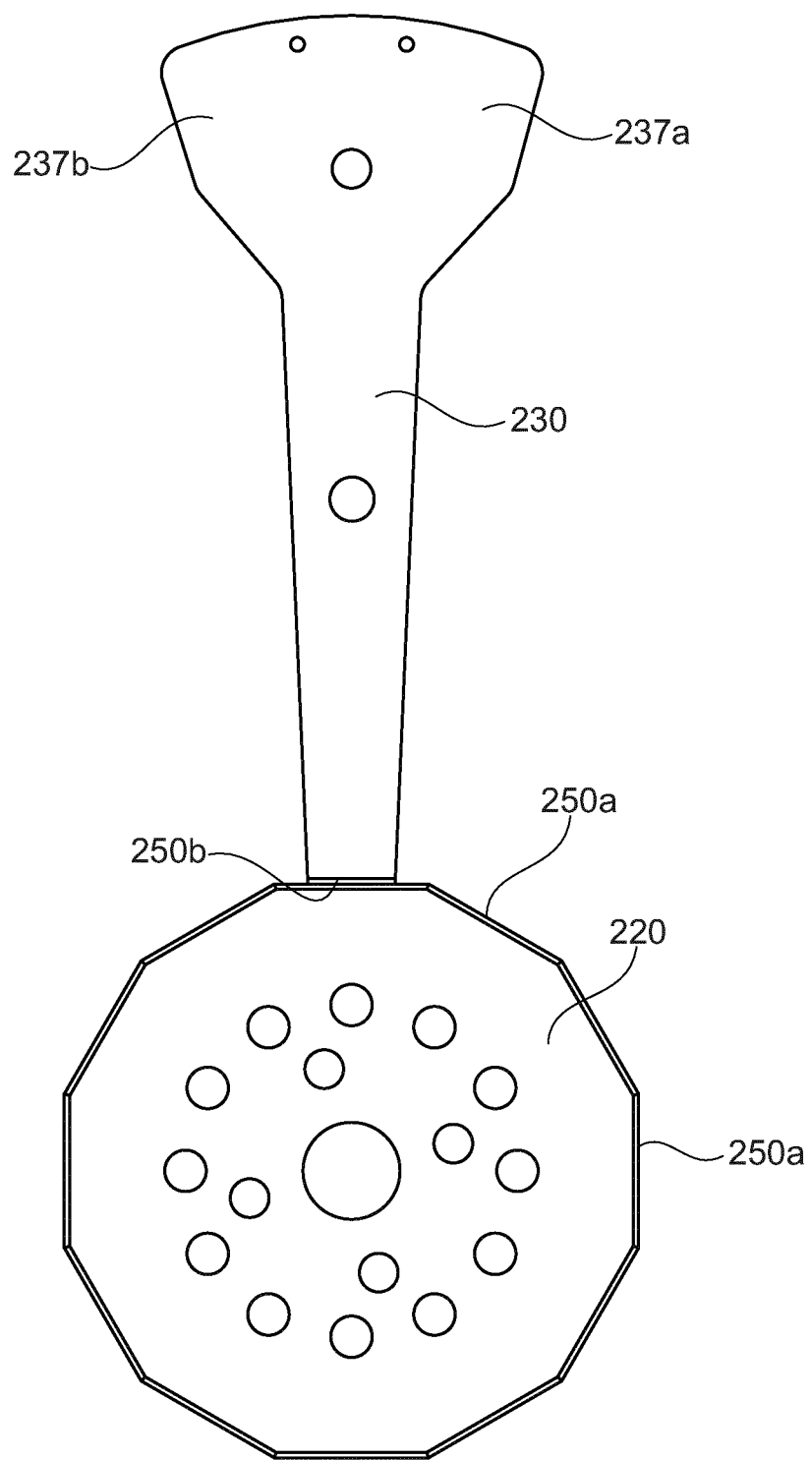
FIG. 12 is a side view of an alternative spacer structure.

In order to allow connection of the elongated spacer means 230 to the hub device 220 by welding or soldering, a hub-device having a dodecagon shape with 12 first bevelled surfaces 250a is shown in FIG. 12. Also the proximal portion 231 of each elongated spacer means 230 (only one shown in FIG. 12) is provided with a second bevelled surface 250b. Depending on what kind of welding or soldering method is used, the first and second bevelled surfaces 250a, 250b may be made as male and female members or only as two male members (i.e. two correspondingly bevelled surfaces 250a, 250b pointing towards one another).

Of course, also in this case, the clock-wise and counter-clockwise extending portions 237a, 237b of the distal portion 235 of the elongated spacer means 230 may be provided on a separate part 240, as shown in FIG. 5. And of course, the female opening may instead be arranged on the separate part 240 and the male part on the radially extending portion 236.

When the saw disc assembly 200 is rotating, the spacer structure 204, 205 provides suction from the centre towards the periphery of the saw disc assembly, i.e. it operates similar to a centrifugal fan with radial fan saw discs. Therefore air and water will be transported from the centre and out at the periphery, efficiently cooling the saw discs. Of course instead the arrangement could be for transporting only air or only fluid or different combinations as further described below.

The fluid flow during operation is preferably in the range of 1-10 litre/minute.

Even though the number of saw discs 201-203 have been described as three, it would be possible to use only two saw discs and with one spacer structure in between.

Furthermore it could be possible to use even more saw discs, adding one spacer structure for each added saw disc.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

For instance, the different embodiments of saw disc assemblies described in the present application could be used in other machines than the one described in the present application using circular cutting saw discs. For instance, the saw disc assemblies could be used in road saws and in hand held power cutters. Of course, in hand held power cutters, the saw disc diameter and other size factors can be smaller than the ranges mentioned above.

Furthermore, in the embodiments shown above, the number of elongated spacer means 230 is twelve. It should however be noted that any number of elongated spacer means could be used, as long as it does not affect the balance of the rotating saw disc assembly 200. Thus, even as few as two diametrically arranged elongated spacer means could be used. Of course, more than twelve elongated spacer means could also be used. Depending on the number of elongated spacer means used, the huh device 220 may have to be adapted to the number of elongated spacer means. Consequently, in case three of five elongated spacer means are to be attached to the hub device, the female members or male members of the hub device will have to be distributed differently on the circumference of the hub device.

LIST OF REFERENCE SIGNS

Axis A-A
Clearance Δh
Laying machine 1
Saw disc device 2
Consolidation and laying means 3
Sawing machine 4
Trench 5
Motor 6
Front wheel 7
Rear wheel 8
Seat 9
Feet support 10
Side wall 12
Bottom 13
Feeding duct 14
Upper portion 15
Rear end 16
Shaft 17
Disc guard 18
Hinged lid 18a
Dust duct 19
Sealing member 20
Dust outlet 21
Dust inlet 22
Saw disc assembly 200
Inner first saw disc 201
Intermediate second saw disc 202
Outer third saw disc 203
Working portion 201a; 202a; 203a
Saw disc support structure 201b; 202b; 203b
Central portion 201c; 202c; 203c
First spacer structure 204
Second spacer structure 205
First through hole 206
Second through hole 207
Fluid inlet 208
Inner member 210
Outer member 211
Bolt 213
Central bolt 215
Hub device 220
Radially extending opening 221
Retention portion 222
Female member 223
Central opening 224
First bore 225
Male retention portion 229
Elongated spacer means 230
Proximal portion 231
Stem 232

Protrusion 233
Male member 234
Distal portion 235
Radially extending portion 236
Clockwise extending portion 237a
Counter-clockwise extending portion 237b
Second bore 238
End surface 239
Separate part 240
Distal female member 241
Distal male member 242
Cut-out 243
Circle sector 244
Flat surface 245
First bevelled surface 250a
Second bevelled surface 250b

The invention claimed is:

1. A saw disc assembly for a sawing machine, the saw disc assembly comprising:
   a pair of saw discs;
   a hub device having a central axis, the hub device being coaxially arranged between the pair of saw discs, the hub device comprising an external wall; and
   a plurality of elongated spacer means, each elongated spacer means being disposed between the pair of saw discs in a substantially radial manner in relation to the hub device, each elongated spacer means being a separate part from the hub device;
   wherein each elongated spacer means comprises a stem and a distal portion, the distal portion extending from a distal end of the stem;
   wherein the stem comprises a proximal end that is engaged with the external wall of the hub device;
   wherein each elongated spacer means is affixed to the pair of saw discs at the proximal end of the stem and at the distal portion;
   wherein the saw disc assembly is configured to cut a singular trench that is the width of the saw disc assembly in a surface to be cut;
   wherein the elongated spacer means are separated by open-ended gaps that radially extend from the hub device and separate the distal portions of adjacent elongated spacer means, wherein each open-ended gap comprises a first gap portion, a second gap portion that extends radially from the first gap portion, and a third gap portion that extends radially from the second gap portion;
   wherein a first width of the first gap portion of the open-ended gap increases as the first gap portion extends radially outward from the central axis, wherein a second width of the second gap portion of the open-ended gap decreases as the second gap portion extends radially outward from the first gap portion, wherein a third width of the third gap portion of the open-ended gap decreases as the third gap portion extends radially outward from the second gap portion;
   wherein the third width decreases at a smaller rate than the second width as the third width extends radially outward.

2. The saw disc assembly of claim 1, wherein each elongated spacer means comprises a first guide hole on the stem and a second guide hole on the distal portion, wherein the first guide hole and the second guide hole facilitate assembly of the saw disc assembly due to the elongated spacer means being the separate part from the hub device and are not aligned with corresponding holes in the saw discs.

3. The saw disc assembly according to claim 1, wherein the saw discs comprise a pair of axially peripheral saw discs;
   wherein the hub device is configured to detachably or non-detachably receive a proximal portion of the stem;
   wherein a distal portion of the elongated spacer means is configured to detachably or non-detachably connect to the pair of axially peripheral saw discs.

4. The saw disc assembly according to claim 1, wherein the hub device is substantially planar and is provided with a first connection means;
   wherein each elongated spacer means is substantially planar and is provided with a second connection means;
   wherein the first and second connection means are corresponding connection means;
   wherein the hub device and each elongated spacer means have substantially the same thickness parallel to a central axis;
   wherein the hub device comprises at least one opening for receiving a fastening element for connection of the hub device to a central portion of the pair of saw discs; and
   wherein a distal portion of each elongated spacer means includes at least one bore for receiving a fastening element for connection to the pair of saw discs.

5. The saw disc assembly according to claim 4, wherein the first connection means comprises a female member;
   wherein retention openings are disposed between the arcuate segments on the hub device;
   wherein the hub device comprises retention portions extending from the retention opening in a substantially circumferential direction of the hub device, the retention opening and the retention portion comprising the female member.

6. The saw disc assembly according to claim 4, wherein the second connection means comprises a male member, the male member including a protrusion from the proximal end of the stem.

7. The saw disc assembly according to claim 4 wherein the first connection means comprises a male member, the male member including a protrusion extending substantially radially relative to the central axis of the hub device.

8. The saw disc assembly according to claim 7, wherein the second connection means comprises a female member;
   wherein a proximal end of the stem defines a retention opening and a retention portion extending from the retention opening in a transversal direction of the stem, the retention opening and the retention portion comprising the female member.

9. The saw disc assembly according to claim 1, wherein a central portion of the pair of saw discs and the hub device of the spacer structure, respectively, is provided with a first fastening means for allowing the hub device to be connected between the pair of saw discs.

10. The saw disc assembly according to claim 9 further comprising:
    a plurality of first through holes in the central portion of the pair of saw discs,
    a plurality of second through holes in the pair of saw discs,
    a plurality of first bores in the hub device, and
    a second bore in the stem of each elongated spacer means,
    wherein the first through holes of the pair of saw discs and the first bores of the hub device are aligned with one another and parallel to the rotational axis;

wherein the second through holes of the pair of saw discs and the second bores of the stems of each elongated spacer means are aligned with one another and parallel to the rotational axis.

11. The saw disc assembly according to claim 1, wherein a peripheral portion of the pair of saw discs and a distal portion of each elongated spacer means of the spacer structure is provided with a distal portion fastening element for allowing each elongated spacer means to be connected between the pair of saw discs.

12. The saw disc assembly according to claim 1, wherein the pair of saw discs comprises at least one through hole in the pair of saw discs, wherein one of the at least one through hole and a stem portion bore in the stem of each elongated spacer means is aligned with one another and parallel to the rotational axis.

13. The saw disc assembly according to claim 1, wherein the saw discs comprise at least one fluid inlet for allowing a fluid to enter a space between the pair of saw discs not being occupied by the spacer structure.

14. The saw disc assembly according to claim 1, wherein the pair of saw discs are a pair of peripheral saw discs and the spacer structure is a first spacer structure;
wherein an intermediate saw disc is arranged between the pair of peripheral saw discs;
wherein the first spacer structure is arranged between a first of the peripheral saw discs and the intermediate saw disc; and
wherein a second spacer structure is arranged between a second of the peripheral saw discs and the intermediate saw disc.

15. The saw disc assembly according to claim 1, wherein the pair of saw discs are a pair of peripheral saw discs and the spacer structure is a first spacer structure;
wherein a pair of intermediate saw discs are arranged between the pair of peripheral saw discs;
wherein the first spacer structure is arranged between the pair of intermediate saw discs;
wherein a second spacer structure is arranged between a first of the peripheral saw discs and a first of the intermediate saw discs; and
wherein a third spacer structure is arranged between a second of the peripheral saw discs and a second of the intermediate saw discs.

16. The saw disc assembly according to claim 1, wherein the pair of saw discs are a pair of peripheral saw discs and the spacer structure is a first spacer structure;
wherein a plurality of intermediate saw discs are arranged between the pair of peripheral saw discs;
wherein the first spacer structure is arranged between at least two adjacent intermediate saw discs, and at least one further spacer structure is arranged between one or more further adjacent intermediate saw discs.

17. A sawing machine including the saw disc assembly of claim 1.

18. A saw disc assembly for a sawing machine, the saw disc assembly comprising:
a pair of saw discs;
a hub device having a central axis, the hub device being configured to be coaxially arranged between the pair of saw discs; and
a plurality of elongated spacer means, each elongated spacer means being configured to be disposed between the pair of saw discs in a substantially radial manner in relation to a central portion of the pair of saw discs;
wherein each of the elongated spacer means comprises:
a proximal portion that is a first separate part of the elongated spacer means and is attached to the hub device, the proximal portion comprising a proximal portion bore that, with a proximal portion fastening element that passes through the proximal portion bore, secures the proximal portion to the pair of saw discs; and
a distal portion that is a second separate part of the elongated spacer means and is attached to a distal end of the proximal portion, the distal portion comprising a distal portion bore that, with a distal portion fastening element that passes through the distal portion bore, secures distal portion to the pair of saw discs and secures the distal portion into position to engage with the proximal portion;
wherein each elongated spacer means is affixed to the pair of saw discs at the proximal portion and at the distal portion to maintain each elongated spacer means in a stationary position relative to the pair of saw discs;
wherein the elongated spacer means are separated by open-ended gaps that radially extend from the hub device and separate the distal portions of adjacent elongated spacer means, wherein each open-ended gap comprises a first gap portion, a second gap portion that extends radially from the first gap portion, and a third gap portion that extends radially from the second gap portion;
wherein a first width of the first gap portion of the open-ended gap increases as the first gap portion extends radially outward from the central axis, wherein a second width of the second gap portion of the open-ended gap decreases as the second gap portion extends radially outward from the first gap portion, wherein a third width of the third gap portion of the open-ended gap decreases as the third gap portion extends radially outward from the second gap portion;
wherein the third width decreases at a smaller rate than the second width as the third width extends radially outward;
wherein the saw disc assembly is configured to cut a singular trench that is the width of the saw disc assembly in a surface to be cut.

19. The saw disc assembly according to claim 18, wherein the distal portion of each elongated spacer means is made of a material harder than that of the proximal portion of each elongated spacer means.

20. The saw disc assembly according to claim 19,
wherein the distal portion is made of a powder metal material,
wherein the distal portion is made of a high speed steel having a hardness of at least 60 HRC, or
wherein the distal portion is provided with a coating containing a nitride, selected from TiCN, TiN, TiAlN, TiAlCN or CrN, applied by physical vapour deposition.

21. The saw disc assembly of claim 18, wherein the distal portion is only connected to the hub device through the spacer structure via the proximal portion; and
wherein connection interfaces between both the hub device and the proximal portion and the proximal portion and the distal portion comprise corresponding male and female connection elements.

22. The saw disc assembly of claim 18, wherein each elongated spacer means comprises a first guide hole on the proximal portion and a second guide hole on the distal portion, wherein the first guide hole and the second guide hole facilitate assembly of the saw disc assembly due to the elongated spacer means being the separate part from the hub device and are not aligned with corresponding holes in the saw discs.

23. A saw disc assembly for a sawing machine, the saw disc assembly comprising:
a pair of saw discs;
a hub device having a central axis, the hub device being configured to be coaxially arranged between the pair of saw discs, the hub device comprising an external wall that is comprises a plurality of segments on the hub device that are most distanced from the central axis of the hub device; and
a plurality of elongated spacer means, each elongated spacer means being disposed between the pair of saw discs in a substantially radial manner in relation to the hub device, each elongated spacer means being a separate part from the hub device;
wherein each elongated spacer means comprises a stem and a distal portion, the distal portion extending from a distal end of the stem;
wherein the proximal end of the stem has a radially extending protrusion or recess extending from the end surface;
wherein the at least one elongated spacer means is affixed to the pair of saw discs at the proximal end of the stem and at the distal portion;
wherein the elongated spacer means are separated by open-ended gaps that radially extend from the hub device and separate the distal portions of adjacent elongated spacer means;
wherein a first width of the first gap portion of the open-ended gap increases as the first gap portion extends radially outward from the central axis, wherein a second width of the second gap portion of the open-ended gap decreases as the second gap portion extends radially outward from the first gap portion, wherein a third width of the third gap portion of the open-ended gap decreases as the third gap portion extends radially outward from the second gap portion;
wherein the third width decreases at a smaller rate than the second width as the third width extends radially outward;
wherein the saw disc assembly is configured to cut a singular trench that is the width of the saw disc assembly in a surface to be cut.

24. The saw disc assembly of claim 23, wherein each elongated spacer means comprises a first guide hole on the stem and a second guide hole on the distal portion, wherein the first guide hole and the second guide hole facilitate assembly of the saw disc assembly due to the elongated spacer means being the separate part from the hub device and are not aligned with corresponding holes in the saw discs.

25. A saw disc assembly for a sawing machine, the saw disc assembly comprising:
a pair of saw discs;
a hub device having a central axis, the hub device being coaxially arranged between the pair of saw discs, the hub device comprising an external wall that is a plurality of segments on the hub device that are most distanced from the central axis of the hub device; and
a plurality of elongated spacer means, each elongated spacer means being disposed between the pair of saw discs in a substantially radial manner in relation to the hub device, each elongated spacer means being a separate part from the hub device;
wherein each elongated spacer means comprises a stem and a distal portion, the distal portion extending from a distal end of the stem;
wherein the stem comprises a proximal end that is engaged with an external wall of the hub device;
wherein the elongated spacer means are separated by open-ended gaps that radially extend from the hub device and separate the distal portions of adjacent elongated spacer means, wherein each open-ended gap comprises a first gap portion, a second gap portion that extends radially from the first gap portion, and a third gap portion that extends radially from the second gap portion;
wherein a first width of the first gap portion of the open-ended gap increases as the first gap portion extends radially outward from the central axis, wherein a second width of the second gap portion of the open-ended gap decreases as the second gap portion extends radially outward from the first gap portion, wherein a third width of the third gap portion of the open-ended gap decreases as the third gap portion extends radially outward from the second gap portion;
wherein the third width decreases at a smaller rate than the second width as the third width extends radially outward;
wherein the saw disc assembly is configured to cut a singular trench that is the width of the saw disc assembly in a surface to be cut.

26. The saw disc assembly of claim 25, wherein each elongated spacer means comprises a first guide hole on the stem and a second guide hole on the distal portion, wherein the first guide hole and the second guide hole facilitate assembly of the saw disc assembly due to the elongated spacer means being the separate part from the hub device and are not aligned with corresponding holes in the saw discs.

* * * * *

UNITED STATES PATENT AND TRADEMARK OFFICE
CERTIFICATE OF CORRECTION

PATENT NO. : 11,639,592 B2
APPLICATION NO. : 16/081596
DATED : May 2, 2023
INVENTOR(S) : Tobias Nilsson et al.

It is certified that error appears in the above-identified patent and that said Letters Patent is hereby corrected as shown below:

In the Claims

In Column 17, Claim 23, Line 10, "that is comprises" should read --that comprises--

Signed and Sealed this
Thirteenth Day of June, 2023

Katherine Kelly Vidal
*Director of the United States Patent and Trademark Office*